United States Patent
Ito

(10) Patent No.: US 7,024,276 B2
(45) Date of Patent: Apr. 4, 2006

(54) LEGGED MOBILE ROBOT AND ITS MOTION TEACHING METHOD, AND STORAGE MEDIUM

(75) Inventor: Masato Ito, Tokyo (JP)

(73) Assignee: Sony Corporation, Tokyo (JP)

(*) Notice: Subject to any disclaimer, the term of this patent is extended or adjusted under 35 U.S.C. 154(b) by 183 days.

(21) Appl. No.: 10/297,222

(22) PCT Filed: Apr. 2, 2002

(86) PCT No.: PCT/JP02/03288

§ 371 (c)(1),
(2), (4) Date: Jul. 21, 2003

(87) PCT Pub. No.: WO02/081157

PCT Pub. Date: Oct. 17, 2002

(65) Prior Publication Data

US 2004/0036437 A1    Feb. 26, 2004

(30) Foreign Application Priority Data

Apr. 3, 2001    (JP) .............................. 2001-104557

(51) Int. Cl.
*G06F 19/00* (2006.01)

(52) U.S. Cl. ...................... 700/245; 700/247; 700/248; 700/249; 700/250; 700/251; 700/252; 700/253; 318/568.1; 318/568.11; 318/568.12; 318/568.15; 318/568.16; 318/568.17; 318/568.18; 701/23; 901/1

(58) Field of Classification Search ................ 700/245, 700/247–253, 258–264; 901/1; 318/568.1, 318/568.11, 568.12, 568.15, 568.16, 568.17, 318/568.18, 568.22, 568.25; 701/23

See application file for complete search history.

(56) References Cited

U.S. PATENT DOCUMENTS

| 5,432,417 A | | 7/1995 | Takenaka et al. |
| 5,594,644 A | * | 1/1997 | Hasegawa et al. ............. 701/23 |
| 5,838,130 A | * | 11/1998 | Ozawa ..................... 318/568.2 |
| 5,841,258 A | * | 11/1998 | Takenaka ................ 318/568.12 |
| 5,872,893 A | * | 2/1999 | Takenaka et al. ............ 700/245 |

(Continued)

FOREIGN PATENT DOCUMENTS

EP           001136193 A2 *   5/2001

(Continued)

OTHER PUBLICATIONS

Lim et al., Waseda biped humanoid robots realizing human-like motion, 2000, IEEE, pp. 525-530.*
Hirai et al., The development of Honda humanoid robot, 1999, IEEE, pp. 1321-1326.*

(Continued)

*Primary Examiner*—Thomas G. Black
*Assistant Examiner*—McDieunel Marc
(74) *Attorney, Agent, or Firm*—Frommer Lawrence & Haug LLP; William S. Frommer; Thomas F. Presson

(57) ABSTRACT

Learning-type motion control is performed using a hierarchical recurrent neural network. A motion pattern provided through human teaching work is automatically time-serially segmented with the hierarchical recurrent neural network, and the motion control of a machine body is carried out with a combination of the segmented data, whereby various motion patterns can be produced. With the time-serial segmentation, local time-serial patterns and an overall pattern as a combination of the local time-serial patterns are produced. For those motion patterns, indices for static stability and dynamic stability of the machine body, e.g., ZMP stability criteria, are satisfied and hence control stability is ensured.

6 Claims, 17 Drawing Sheets

1 LEGGED MOVING ROBOT
(FRONT)

1 LEGGED MOVING ROBOT
(REAR)

U.S. PATENT DOCUMENTS

| | | | |
|---|---|---|---|
| 6,243,623 B1 * | 6/2001 | Takenaka et al. | 700/245 |
| 6,289,265 B1 * | 9/2001 | Takenaka et al. | 700/245 |
| 6,458,011 B1 * | 10/2002 | Inoue et al. | 446/376 |
| 6,463,356 B1 * | 10/2002 | Hattori et al. | 700/245 |
| 6,493,606 B1 * | 12/2002 | Saijo et al. | 700/245 |
| 6,580,969 B1 * | 6/2003 | Ishida et al. | 700/245 |

FOREIGN PATENT DOCUMENTS

| | | |
|---|---|---|
| EP | 001103451 A2 * | 9/2001 |
| JP | 5-305585 | 11/1993 |
| JP | 10-133733 | 5/1998 |
| JP | 11-126198 | 5/1999 |
| JP | 11-206152 | 7/1999 |

OTHER PUBLICATIONS

Miyakoshi et al., Three dimensional bipedal stepping motion using neural oscillators—Towards humanoid motion in teh real world, 1998, IEEE, pp. 84-89.*

Lim et al., Emotion expression of a biped personal robot, 2000, IEEE, pp. 191-196.*

Peters II et al., A software agen based control system for human-Robot Interaction, 1999, Internet, pp. 1-8.*

Fong et al., Collaboration, dialogue, and human-robot interaction, 2001, Internet, pp. 1-10.*

Lim et al., Control to realize human-like walking of a biped humanoid robot, 2000, IEEE, pp. 3271-3276.*

* cited by examiner

FIG. 14
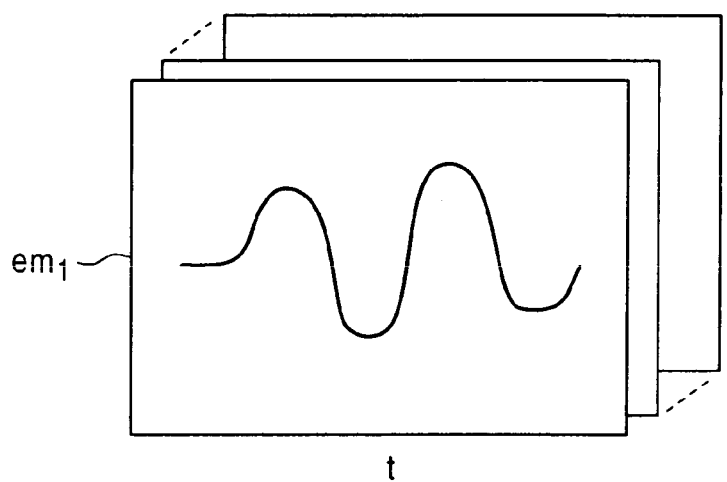
FEASIBLE MOTION PATTERN A
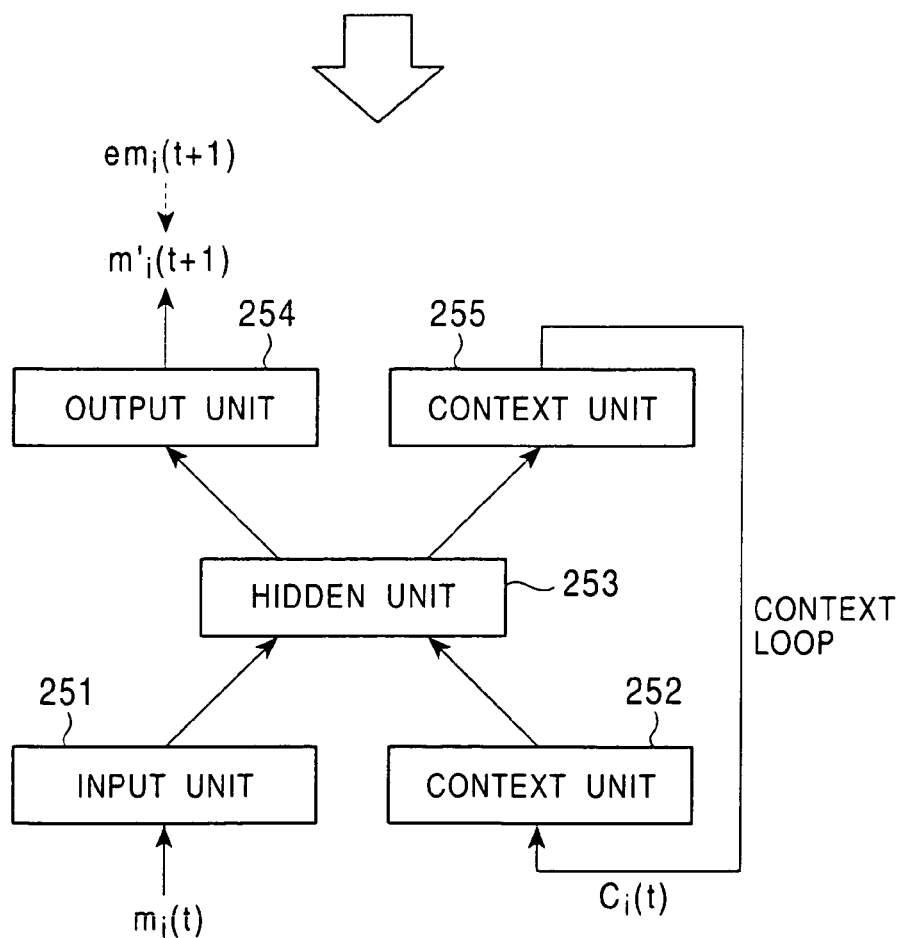

FIG. 15
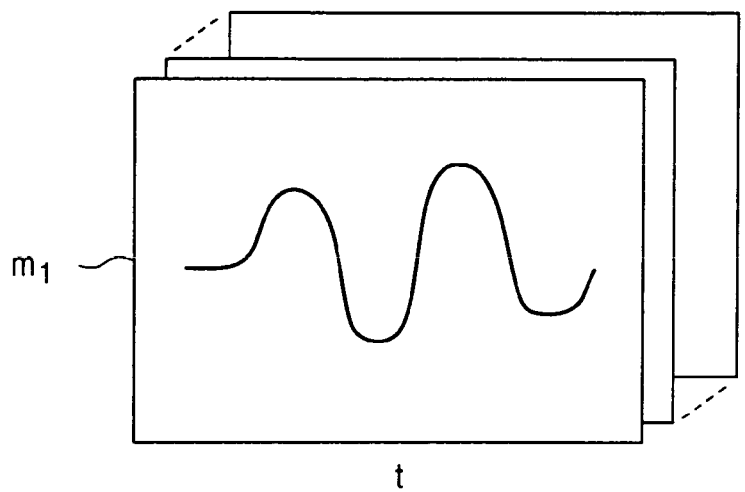
$m_1$
t
MOTION PATTERN A PRODUCED
BY RECURRENT NEURAL NETWORK
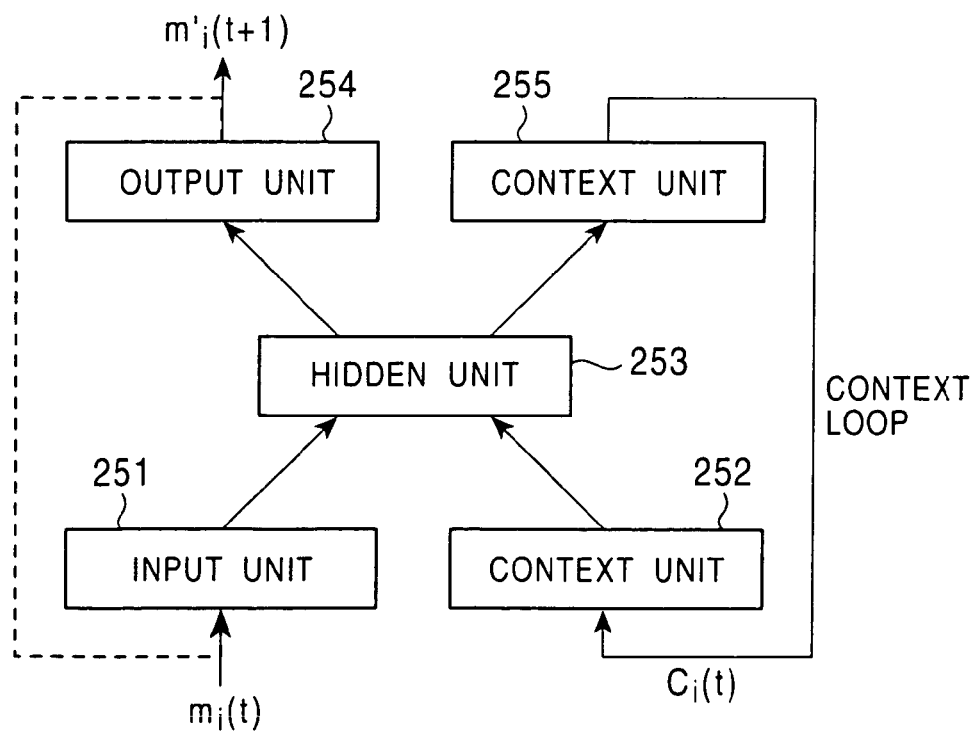

LEGGED MOBILE ROBOT AND ITS MOTION TEACHING METHOD, AND STORAGE MEDIUM

TECHNICAL FIELD

The present invention relates to a legged moving robot having joints with plural degrees of freedom, a method of teaching motions in the robot, and a storage medium product. More particularly, the present invention relates to a legged moving robot which learns a motion pattern in the form of time-serial data using a recurrent neural network, a method of teaching motions in the robot, and a storage medium product.

BACKGROUND ART

A mechanical machine capable of performing motions in imitation of human actions based on electrical or magnetic working is generally called a "robot". It is said that the word "robot" is derived from Slavic "ROBOTA (slave machine)". In Japan, the use of robots has begun to spread from the end of the 1960s. However, many of robots have been industrial robots, such as manipulators and transport robots, intended for automation and unattended operation of production works in factories.

A stationary robot that is fixedly installed in a certain specific place when used, such as an arm robot, acts only in a stationary and local working space for, e.g., parts assembly or selection works. On the other hand, a moving robot has no limitation on working space, and can freely move along predetermined routes or undecided routes to perform predetermined or arbitrary human works instead of workers, and to provide a wide variety of services by behaving like a human being, a dog or any other living body. In particular, comparing with conventional crawler or tire type robots, a legged moving robot is more instable and has a more difficulty in posture control and walking control, but the legged moving robot is superior in that it is able not only to realize flexible walking and running actions regardless of whether the ground is even or uneven, such as climbing up and down stairs or a ladder and riding over an obstacle, but also to coexist in complicated human living spaces.

Recently, research and development regarding legged moving robots, such as a pet robot imitating body mechanisms and actions of a four-legged animal, e.g., a dog or a cat, and a humanoid robot being "human-like" or "of human type" and designed based on, as a model, body mechanisms and actions of a two-legged upright walking animal, e.g., a human being, have progressed and an expectation on the actual use of those legged moving robots has increased. For example, Sony Corporation publicized a two-legged walking humanoid robot "SDR-3X" on Nov. 25, 2000.

Implanting predetermined actions in a robot is called "teaching". Action teaching is performed, for example, by a method in which an operator or a user teaches actions in the worksite while holding the robot by hands and feet, or a method in which action patterns are inputted, created and edited on an editor, such as a computer, provided externally of the robot.

In conventional robots, however, an operator has been required to understand and learn the operating environment of each robot to a considerable extent for teaching actions in the robot, and a large burden has been imposed on work of the operator.

Also, in conventional methods for teaching and learning actions in and by robots, it has been general to follow a process of installing motion data in the robot beforehand, and reproducing actions corresponding to the motion data depending on external situations. With such a teaching and learning method, kinematic matching and dynamic matching can be satisfied when reproducing the robot actions, but there occur problems in that a new action is difficult to create and unexpected situations cannot be coped with. Further, since motions to be given to a robot are produced offline, it is not always ensured that the motions having been given to the robot beforehand are optimum for the shape and the current working environment of the robot.

When causing a humanoid robot to perform motions like a human being, there is known a teaching method in which robot motion control is performed using motion patterns obtained with the aid of a motion teaching device such as a motion capture. With the motion capture, skeleton actions for realizing motion patterns to be taught can be obtained by capturing measurement points attached to various positions over the whole body of a human being (operator) with a camera, and tracking respective movements of the measurement points.

In the case attempting to act a robot in imitation of various human motions, however, all of motion patterns corresponding to those human motions must be stored.

Also, it is uncertain that the motion patterns obtained with the aid of a motion teaching device, such as a motion capture, can be directly applied to a robot. For example, because physical characteristics, such as weight balance of the whole body, differ between the operator and a machine body of the robot, kinematic matching and dynamic matching, e.g., ZMP stability determining criteria, are not always satisfied and some of taught motions cannot be reproduced when the captured motion patterns are directly applied to the robot.

Meanwhile, a neural network has been recently utilized in several examples of robot control.

The term "neural network" means a simplified model of the neural network in the human brain and is a network in which nerve cells, i.e., neurons, are interconnected through synapses allowing signals to pass only in one direction. Signal transmission between neurons is performed through synapses, and various kinds of information processing can be realized by properly adjusting resistance of each synapse, i.e., a weight applied from each synapse. Specifically, each neuron receives outputs from other one or more neurons after being weighted by respective synapses, modifies the total sum of input values in accordance with a nonlinear response function, and outputs the modified result to another neuron.

Control utilizing a neural network is directly adaptable for a nonlinear problem such as represented by friction and viscosity, and eliminates the need of changing parameter settings because the control includes the learning function.

For example, the specifications of Japanese Patent Application Nos. 2000-251483 and 2000-273805, which were already assigned to the applicant of this application, disclose the learning function utilizing a neural network in an autonomous moving robot.

Of those specifications, Japanese Patent Application No. 2000-251483 discloses a robot including perception sensors, such as a camera, and a recurrent neural network as a learning mechanism. This disclosed robot can move an external movable object by its own controllable part, percept the environment in which the object is placed and movements of the object using the perception sensors, and learn correlation between manners of moving respective joints of the robot and movements of the object. Also, the robot can predict movements of the object and learn by itself motions for moving the object based on novelty rewarding.

Japanese Patent Application No. 2000-273805 discloses a robot capable of learning time-serial events based on a recurrent neural network. This disclosed robot can learn correspondence between music and pose to be taken by the robot by employing, as teaching signals, music information and time-serial joint angle parameters. After the learning, the robot can predict a next robot pose from the preceding robot pose and the music information perceived by the auditory sense, and can perform a dance in match with the music. Further, for a piece of music that is not yet taught, the robot can perform a dance by combining dances, which are contained in the music taught so far and are closer to the piece of music, from the pieces of music having been already taught and the experiences of dances performed so far.

However, there are few examples in which a neural network is applied to the case where motions are taught in a robot using a motion capture.

DISCLOSURE OF THE INVENTION

An object of the present invention is to provide a superior legged moving robot, which can satisfactorily learn motion patterns in the form of time-serial data using a recurrent neural network, a method of teaching motions in the robot, and a storage medium product.

In view of the above-mentioned problems in the art, according to a first aspect of the present invention, there is provided a legged moving robot including drive units with plural degrees of freedom of joints, the robot comprising:

a motion pattern input unit for inputting a motion pattern from the exterior;

a plurality of determining units for previously storing local feasible motion patterns regarding respective degrees of freedom of joints, and each determining agreement between a motion pattern inputted from the motion pattern input unit and the stored motion pattern;

a gate unit for gating a determination result in each of the determining units;

a merging unit for merging outputs from the gate unit and producing an overall motion pattern for a machine body of the legged moving robot; and a taught motion pattern realizing unit for storing a totalized result in the merging unit as taught motion pattern data, and/or reproducing the result on the machine body of the legged moving robot.

In the legged moving robot according to the first aspect of the present invention, the determining units and the gate unit are each constituted as a recurrent neural network.

Each of the determining units is constituted as a recurrent neural network comprising an input layer constituted as a unit group to which input data is inputted, an output layer constituted as a unit group which outputs a network output, and an intermediate layer constituted as a unit group other than the aforementioned unit groups. The input layer is made up of an input unit to which a local time-serial motion pattern for the machine body of the legged moving robot is inputted, and a context unit. The intermediate layer is constituted as a hidden unit. The output layer is made up of an output unit which outputs a prediction of the local time-serial motion pattern, and a context unit. A part of the output from the output layer is fed back to the context unit of the input layer via a context loop, whereby the determining unit can perform learning of the time-serial motion pattern.

Further, the gate unit is constituted as a recurrent neural network comprising an input layer constituted as a unit group to which input data is inputted, an output layer constituted as a unit group which outputs a network output, and an intermediate layer constituted as a unit group other than the aforementioned unit groups. The input layer is made up of an input unit to which a gate serving as a weight applied to the determining unit is inputted, and a context unit. The intermediate layer is constituted as a hidden unit. The output layer is made up of an output unit which outputs a gate serving as a weight applied to the determining unit, and a context unit. A part of the output from the output layer is fed back to the context unit of the input layer via a context loop, whereby the gate can perform learning of the time-serial gate.

In the legged moving robot according to the first aspect of the present invention, a hierarchical recurrent neural network is constructed such that the gate unit is positioned at an upper level and the determining units are positioned at a lower level. A local motion pattern is handled by each determining unit; namely, a motion pattern is handled while it is automatically time-serially segmented. Then, based on gate outputs from the gate unit, the merging unit produces an overall motion pattern for the entire machine body of the legged moving robot.

The determining units previously store feasible motion patterns regarding respective degrees of freedom of joints, and each of the determining units determines agreement between a motion pattern inputted from the motion pattern input unit and the stored motion pattern. In other words, each determining unit is able to experientially determine whether a motion pattern taught through the motion pattern input unit is feasible (i.e., whether kinematic matching and dynamic matching in the machine body is satisfied).

Then, the merging unit is able to produce an overall motion pattern by merging determination results of the determining units together based on respective gate outputs from the gate unit and combining the local motion patterns for which feasibility is ensured. For such an overall motion pattern, kinematic matching and dynamic matching are ensured in the entire machine body of the legged moving robot.

With the legged moving robot according to the first aspect of the present invention, therefore, a motion pattern provided through human teaching work is automatically time-serially segmented with the hierarchical recurrent neural network, and the motion control of the machine body is carried out with a combination of the segmented data, whereby various motion patterns can be produced.

Further, with the legged moving robot according to the first aspect of the present invention, various actions taught by an operator can be realized on a humanoid robot using motion patterns which are feasible by the robot and have been learned in advance.

The term "feasible motion patterns" used herein means motion patterns for which kinematic matching and dynamic matching, e.g., ZMP stability determining criteria, are ensured in the machine body of the legged moving robot.

The motion pattern input unit may be constituted as a motion capturing device for capturing, by a camera, measurement points attached to various positions over the whole body of an operator, tracking movements of the measurement points, and obtaining motions of a skeleton to realize the taught motion pattern, or may be constituted as a device for inputting motion pattern data obtained through the motion capturing device.

Alternatively, the motion pattern input unit may be constituted as a device for inputting motion pattern data obtained through a teaching pendant.

As an alternative, the motion pattern input unit may be constituted as a device for inputting motion pattern data obtained through direct teaching directly made on the machine body of the legged moving robot.

According to a second aspect of the present invention, there is provided a method of teaching motions in a legged moving robot including drive units with plural degrees of freedom of joints, the method comprising the steps of:

a motion pattern inputting step of inputting a motion pattern from the exterior;

a plurality of determining steps of previously storing local feasible motion patterns regarding respective degrees of freedom of joints, and each determining agreement between a motion pattern inputted in the motion pattern inputting step and the stored motion pattern;

a gating step of gating a determination result in each of the determining steps; a merging step of merging outputs from the gating step and producing an overall motion pattern for a machine body of the legged moving robot; and a taught motion pattern realizing step of storing a totalized result in the merging step as taught motion pattern data, and/or reproducing the result on the machine body of the legged moving robot.

In the method of teaching motions in the legged moving robot according to the second aspect of the present invention, the determining steps and the gating step are each constituted by a recurrent neural network. More specifically, a hierarchical recurrent neural network is constructed such that the gating step is positioned at an upper level and the determining steps are positioned at a lower level. A local motion pattern is handled by each determining step; namely, a motion pattern is handled while it is automatically time-serially segmented. Then, based on gate outputs from the gating step, the merging step produces an overall motion pattern for the entire machine body of the legged moving robot.

The determining steps previously store feasible motion patterns regarding respective degrees of freedom of joints, and each of the determining steps determines agreement between a motion pattern inputted from the motion pattern inputting step and the stored motion pattern. In other words, each determining step is able to experientially determine whether a motion pattern taught through the motion pattern inputting step is feasible (i.e., whether kinematic matching and dynamic matching in the machine body is satisfied).

Then, the merging step is able to produce an overall motion pattern by merging determination results in the determining steps together based on respective gate outputs from the gating step and combining the local motion patterns for which feasibility is ensured. For such an overall motion pattern, kinematic matching and dynamic matching are ensured in the entire machine body of the legged moving robot.

With the method of teaching motions in the legged moving robot according to the second aspect of the present invention, therefore, a motion pattern provided through human teaching work is automatically time-serially segmented with the hierarchical recurrent neural network, and the motion control of the machine body is carried out with a combination of the segmented data, whereby various motion patterns can be produced.

Further, with the method of teaching motions in the legged moving robot according to the second aspect of the present invention, various actions taught by an operator can be realized on a humanoid robot using motion patterns which are feasible by the robot and have been learned in advance.

According to a third aspect of the present invention, there is provided a storage medium product physically storing, in a computer readable form, computer software described to execute, on a computer system, a process of teaching motions in a legged moving robot including drive units with plural degrees of freedom of joints, the computer software comprising the steps of:

a motion pattern inputting step of inputting a motion pattern from the exterior;

a plurality of determining steps of previously storing local feasible motion patterns regarding respective degrees of freedom of joints, and each determining agreement between a motion pattern inputted in the motion pattern inputting step and the stored motion pattern;

a gating step of gating a determination result in each of the determining steps; a merging step of merging outputs from the gating step and producing an overall motion pattern for a machine body of the legged moving robot; and a taught motion pattern realizing step of storing a totalized result in the merging step as taught motion pattern data, and/or reproducing the result on the machine body of the legged moving robot.

The storage medium product according to the third aspect of the present invention is a medium for providing computer software in the computer readable form to, e.g., a universal computer system capable of executing various kinds of program code. That medium is, for example, a detachable and portable storage medium such as a CD (Compact Disc), an FD (Flexible Disk) and an MD (Magneto-Optical disc). As an alternative, from the technical point of view, it is also possible to provide the computer software to a particular computer system via a transmission medium, e.g., a network (which may be wireless or wired).

Such a storage medium defines structural and functional cooperative relationships between the computer software and the storage medium for realizing the functions of the predetermined computer software on the computer system. In other words, by installing the predetermined computer software in the computer system through the storage medium product according to the third aspect of the present invention, cooperative actions are developed on the computer system so that similar operation and advantages to those obtainable with the legged moving robot according to the first aspect of the present invention and the method of teaching motions in the legged moving robot according to the second aspect of the present invention can be obtained.

Other objects, features and advantages of the present invention will be apparent from the detailed description set forth below with reference to embodiments of the present invention and the accompanying drawings.

BRIEF DESCRIPTION OF THE DRAWINGS

FIG. 13 shows three kinds of motion pattern data A, B and C feasible in the legged moving robot 1 to be controlled.

FIG. 14 is a set of explanatory views for explaining a learning process in the legged moving robot 1 according to the embodiment; more specifically, FIG. 14 shows a manner of producing, as an output, a predicted value of a joint angle control command value vector em(t+1) at time t+1 when a joint angle control command value vector em(t) is given, as an input, to the expert recurrent neural network 250 at time t.

FIG. 15 is a set of explanatory views for explaining a learning process in the legged moving robot 1 according to the embodiment; more specifically, FIG. 15 shows how the expert recurrent neural network 250 forms a closed loop and autonomously produce a learned motion pattern.

FIG. 16 shows a manner of obtaining taught motion pattern data from human (operator) motions by using a motion capture as motion teaching means.

FIG. 17 shows how expert recurrent neural networks 250-1, etc. serving as lower-level modules operate in segmentation learning of time-serial data using the hierarchical recurrent neural network 200.

FIG. 18 shows how the hierarchical recurrent neural network 200 learns a combined expression of lower-level modules required for reconstructing a taught motion pattern as a gate value pattern produced by a gating recurrent neural network 270.

FIG. 19 shows how the expert recurrent neural networks 250-1, etc. serving as lower-level modules reconstruct, based on the gate value pattern produced by the gating recurrent neural network 270, a taught motion pattern by assigning weights on motion patterns produced by the respective networks 250-1, etc. and combining the weighted motion patterns.

BEST MODE FOR CARRYING OUT THE INVENTION

An embodiment of the present invention will be described below in detail with reference to the drawings.

Figure 1:
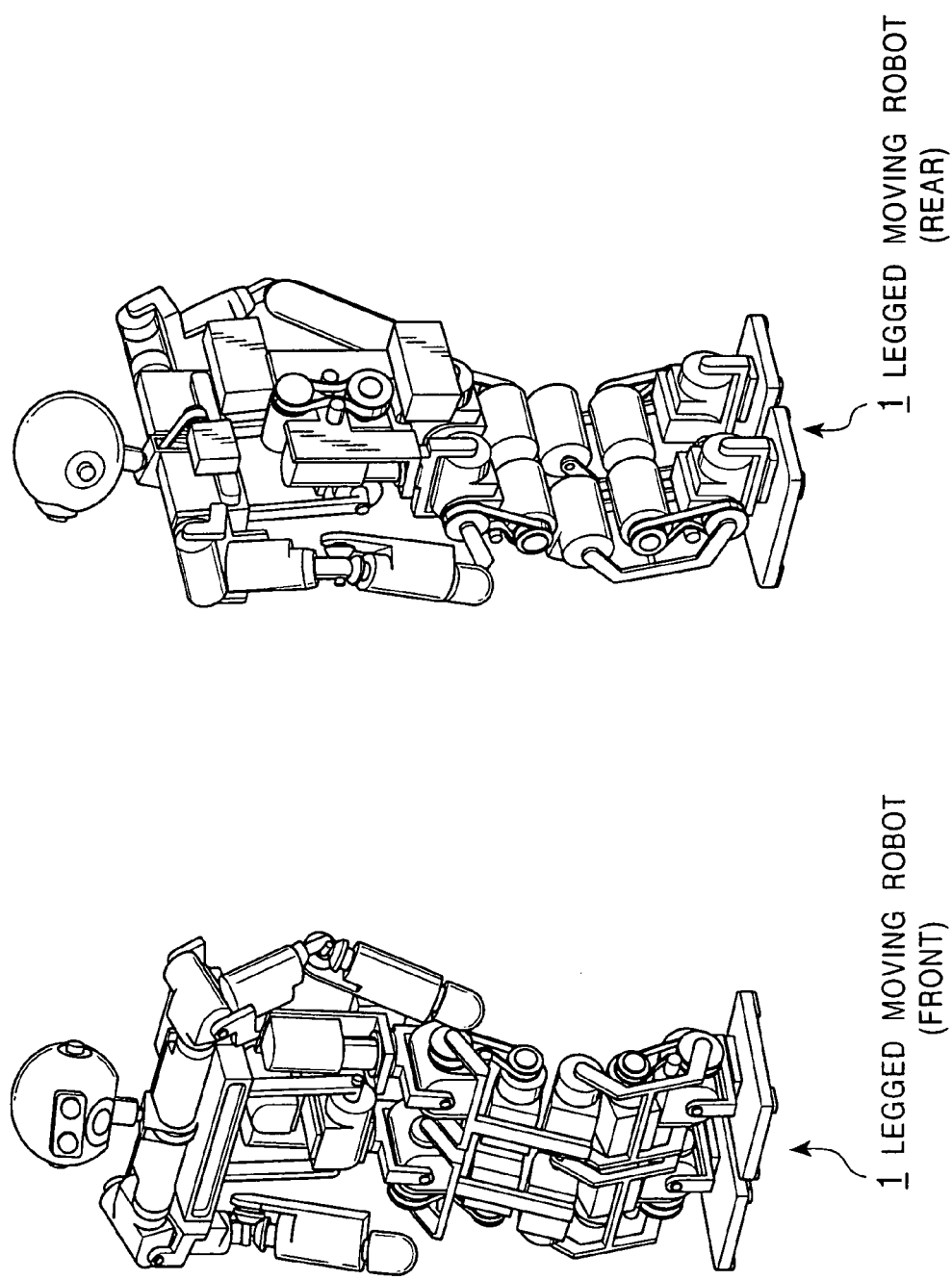
FIG. 1 shows an external appearance of a legged walking robot 1 according to an embodiment of the present invention.

FIG. 1 shows an external appearance of a legged walking robot 1 according to an embodiment of the present invention as viewed from the front and rear side. This walking robot is an amusement robot being human-like or of human type. The robot is made up of the upper limbs including two arms and a head, the lower limbs comprising two legs for realizing the moving operation, and a trunk interconnecting the upper limbs and the lower limbs. Further, touch sensors (not shown) are attached to ground-contact portions (soles) of feet so that touching of the feet on the ground surface can be detected.

Figure 2:
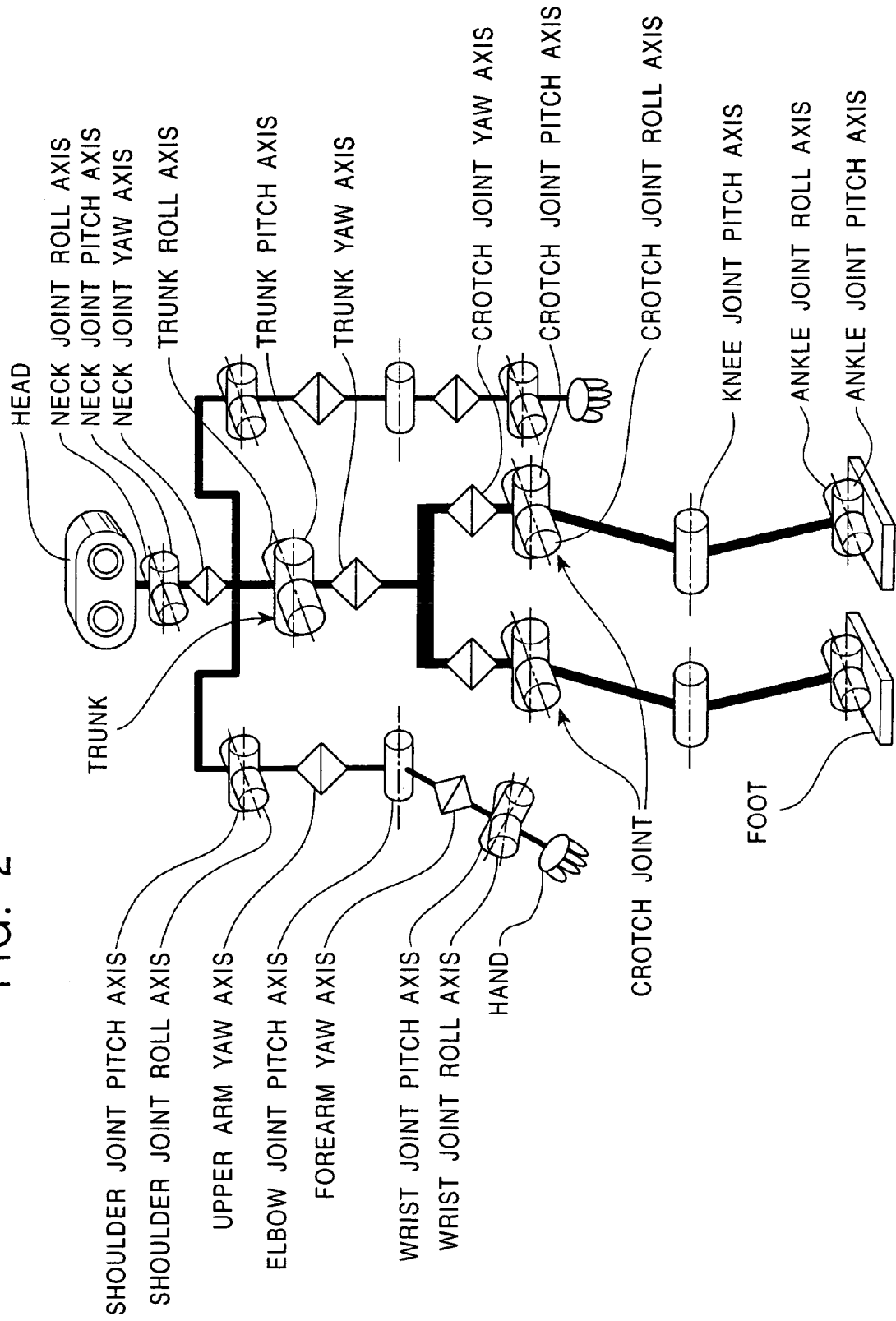
FIG. 2 schematically shows a model constituting degrees of freedom in the legged moving robot 1.

FIG. 2 schematically illustrates a model constituting degrees of freedom of joints in the legged moving robot 1.

A neck joint supporting the head has three degrees of freedom represented by a neck joint yaw axis, a neck joint pitch axis, and a neck joint roll axis.

Also, each arm is made up of a shoulder joint pitch axis, a shoulder joint roll axis, an upper arm yaw axis, an elbow joint pitch axis, a forearm yaw axis, a wrist joint pitch axis, a wrist joint roll axis, and a hand. The hand is in fact a structure including a plurality of fingers and having multiple joints and multiple degrees of freedom. However, the degree of freedom of the hand operation is assumed here to be zero. Accordingly, each arm has seven degrees of freedom.

Further, the trunk has three degrees of freedom represented by a trunk pitch axis, a trunk roll axis, and a trunk yaw axis.

Each of the legs constituting the lower limbs is made up of a crotch joint yaw axis, a crotch joint pitch axis, a crotch joint roll axis, a knee joint pitch axis, an ankle joint pitch axis, an ankle joint roll axis, and a foot. The foot of the human body is in fact a structure including the sole and having multiple joints and multiple degrees of freedom. However, the degree of freedom of the sole of the walking robot 1 in this embodiment is assumed to be zero. Accordingly, each of the left and right legs has six degrees of freedom.

Thus, the legged moving robot 1 according to this embodiment has total 32=3+7×2+3+6×2 degrees of freedom as a whole. However, the legged robot of the present invention is not limited to 32 degrees of freedom. It is as a matter of course that the number of degrees of freedom, i.e., the number of joints, can be increased or reduced as required depending on restriction conditions, demanded specifications, etc. in design and manufacture.

Each degree of freedom of the joint in the legged moving robot 1 is practically implemented using an actuator. The actuator is preferably a small-sized and light-weight one for satisfying such requirements that the robot has a shape similar to that of a human natural body while an excessive expansion is eliminated in outer appearance, and posture control must be performed on an instable structure walking with two legs. For example, an small-sized AC servo actuator being of gear directly-coupled type and having a servo control system incorporated in the form of one chip in a motor unit can be applied to each joint. That type of AC servo actuator is disclosed in, e.g., the specification of Japanese Patent Application No. 11-33386 (Japanese Unexamined Patent Application Publication No. 2000-299970) that was already assigned to the applicant of this application.

Within a trunk frame of the legged moving robot 1, there are mounted a control circuit (not shown) incorporating a microcomputer and other electronic parts, and a battery (not shown) for supplying drive power to the whole of the illustrated robot system. With such a construction, the legged moving robot 1 is able to realize actions, which have been programmed beforehand, by driving the actuators as required.

Figure 3:
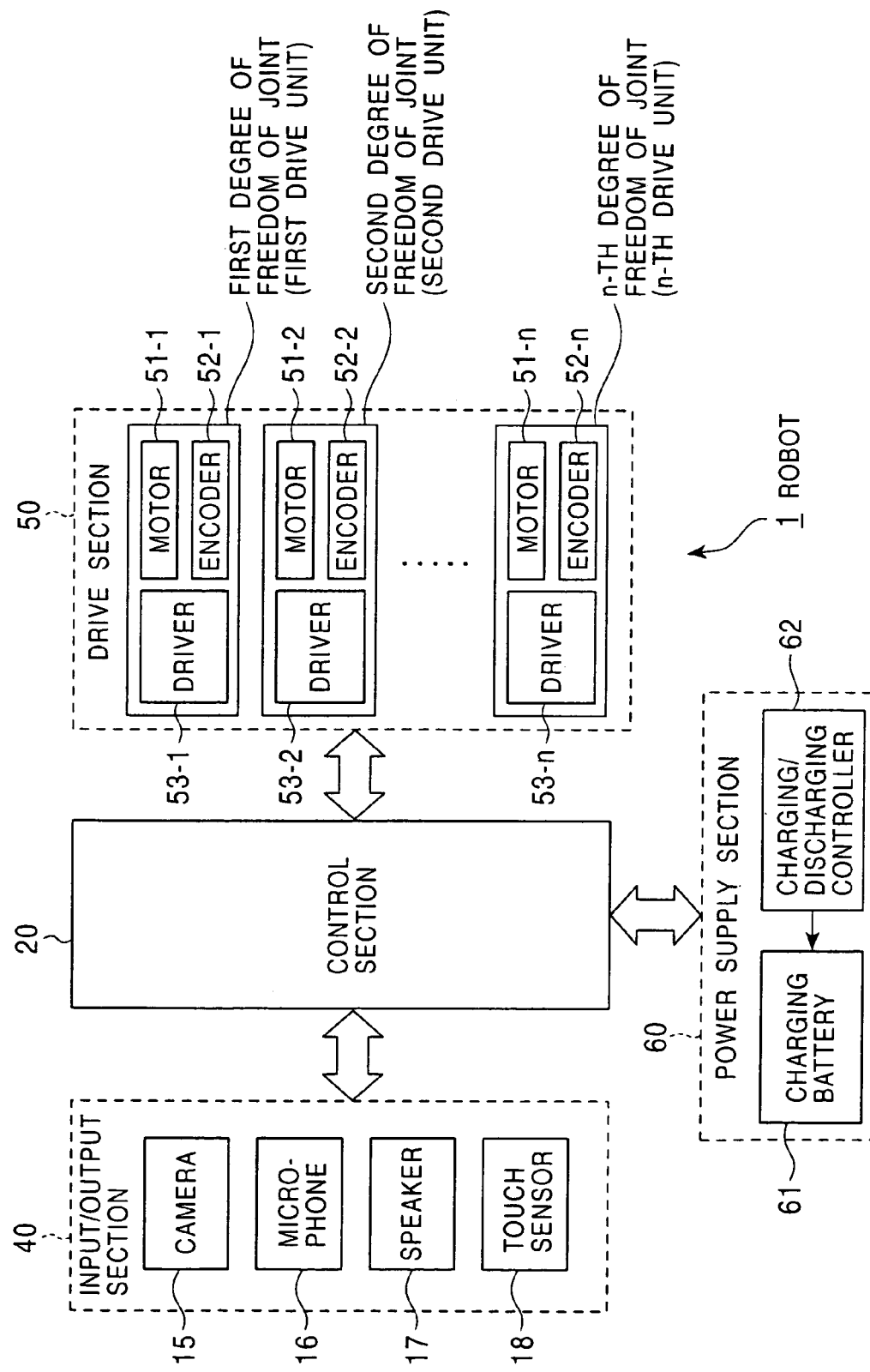
FIG. 3 is a block diagram showing a configuration of electrical and control systems of the legged walking robot 1.

FIG. 3 is a block diagram showing a configuration of electrical and control systems of the legged moving robot 1 according to this embodiment. As shown in FIG. 3, the legged moving robot 1 comprises a control section 20 for executing supervisory control of the overall operation and other data processing, an input/output section 40, a drive section 50, and a power supply section 60. Those sections will be described below.

The input/output section 40 includes, as input units, a CCD camera 15 corresponding to an eye of the legged moving robot 1, a microphone 16 corresponding to an ear, and various sensors corresponding to the five senses, e.g., a touch sensor 18 corresponding to a tactile sense. Also, the input/output section 40 includes, as output units, a speaker 17 corresponding to a mouth, and so on. The output units are effective to express symbolic user feedback from the legged moving robot 1 in the form other than mechanical motion patterns expressed by the legs and so on.

With the provision of the camera 15, the legged moving robot 1 can recognize the shape and the color of any object existing in a working space. Also, the legged moving robot 1 may include, in addition to visual means such as a camera, units for receiving transmitted waves such as infrared rays, sonic waves, supersonic waves and electric waves. With the provision of those receiving units, the position and the direction of a sending source can be measured based on outputs of sensors receiving those transmitted waves.

The drive section 50 is a function block for realizing mechanical motions of the walking robot 1 in accordance with predetermined motion patterns instructed from the control section 20, and is constituted by drive units provided in a one-to-one relation on roll, pitch, yaw and other axes of each of the joints, such as the neck, shoulder, elbow, trunk, crotch, knee and ankle joints. In an illustrated example, the walking robot 1 has n degrees of freedom of the joints, and therefore the drive section 50 comprises a number n of drive units. Each drive unit is constituted by combination of a motor 51 for rotation about a predetermined axis, an encoder 52 for detecting the rotational position of the motor 51, and a driver 53 for adaptively controlling the rotational position and speed of the motor 51 in accordance with an output of the encoder 52.

The power supply section 60 is a function module for, as literally understood, supplying electrical power to various electrical circuits, etc. in the legged moving robot 1. The legged moving robot 1 according to this embodiment is of the autonomously driven type using a battery, and the power supply section 60 comprises a charging battery 61 and a charging/discharging controller 62 for managing the charge/discharge state of the charging battery 61.

The charging battery 61 is constructed as, e.g., a "battery pack" including a plurality of nickel-cadmium cells packaged into the cartridge form.

The charging/discharging controller 62 measures, e.g., the terminal voltage, the amount of charged/discharged current and the ambient temperature of the battery 61, thereby confirming the remaining capacity of the battery 61 and determining the time to start/end the charging, etc.

The control section 20 corresponds to the "brain" and is mounted in, for example, a head unit 3 or a body unit 2 of the moving robot 1.

Figure 4:
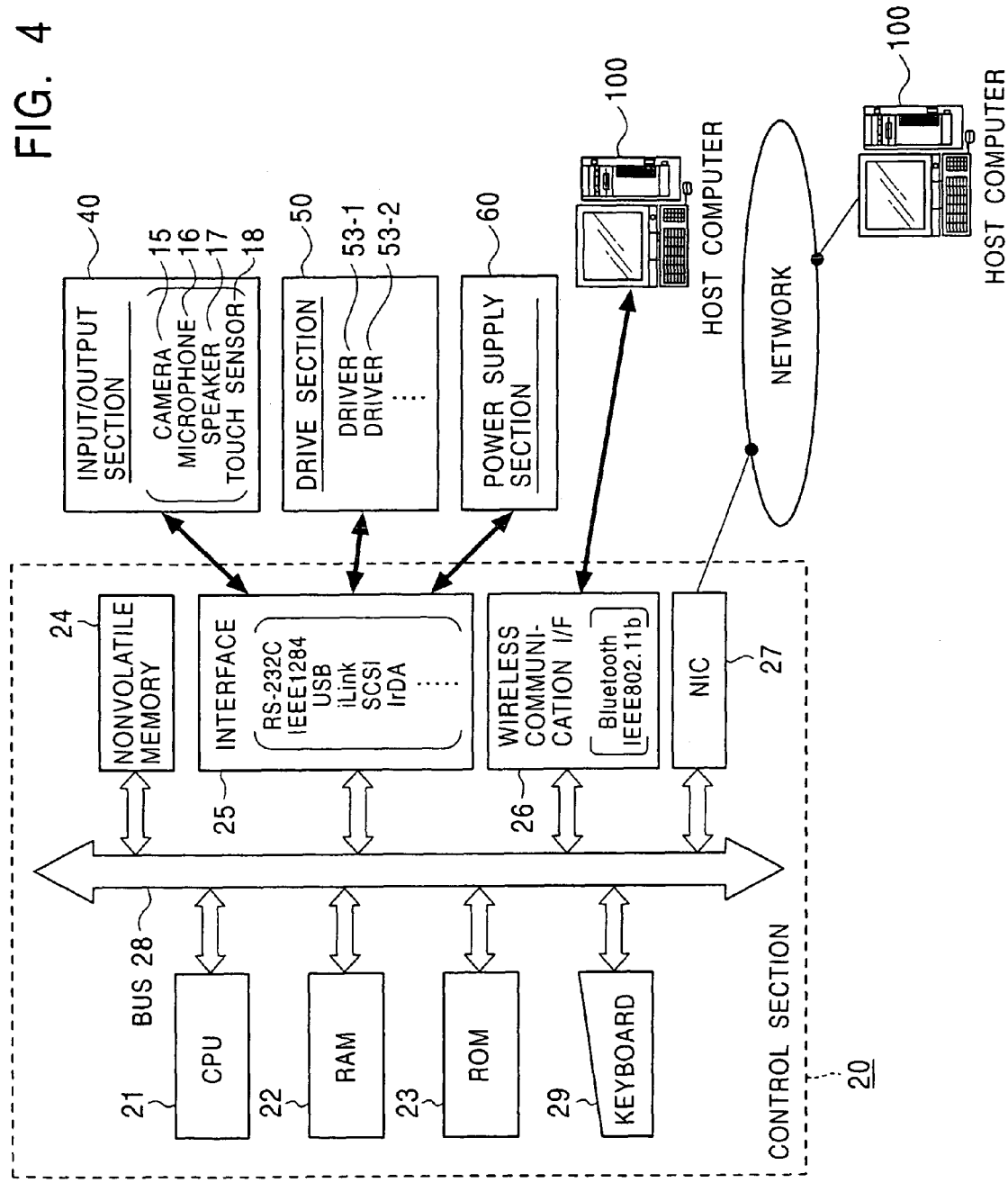
FIG. 4 is a block diagram showing a more detailed configuration of a control section 20.

FIG. 4 shows the configuration of the control unit 20 in more detail. In the control unit 20, as shown in FIG. 4, a CPU (Central Processing Unit) 21 serving as a main controller is connected to memories, other various circuit components, and peripheral units via a bus. Specific addresses (memory addresses or I/O addresses) are assigned to respective units connected to a bus 27 so that the CPU 21 can communicate with any selected one of the units connected to the bus 27.

A RAM (Random Access Memory) 22 is a writable memory constituted by a volatile memory, such as a DRAM (Dynamic RAM), and it is used for loading therein program code for robot control executed by the CPU 21 and temporarily storing working data.

A ROM (Read Only Memory) 23 is a read only memory for permanently storing programs and data. Program code stored in the ROM 23 includes a self-diagnosis test program executed upon power-on of the legged moving robot 1, a control program (firmware) for defining the operation of the moving robot 1.

In this embodiment, the learning function based on a recurrent neural network (RNN) is applied to the control program for the legged moving robot 1. Using the recurrent neural network enables the robot to perform time-serial learning. For example, various motions can be produced by automatically segmenting and storing a motion pattern, which has been taken in by a motion capture or the like, with a hierarchical recurrent neural network, and performing motion control based on combination of segmented pieces of time-serial data. Details of the configuration of the recurrent neural network and the learning/teaching mechanism using the recurrent neural network will be described later.

A nonvolatile memory 24 is constituted by a memory device capable of being electrically erased and rewritten, such as an EEPROM (Electrically Erasable and Programmable ROM), and it is used for holding data, which is to be sequentially updated, in a nonvolatile manner. The data to be sequentially updated includes, e.g., a model for defining a behavior pattern of the legged moving robot 1.

An interface 25 is a device for connection to a unit outside the control section 20 so that data can be exchanged between them. The interface 25 enables data to be inputted and outputted with respect to, e.g., the camera 15, the microphone 16 and the speaker 17. Also, the interface 25 enables data and commands to be inputted and outputted with respect to the drivers 53-1, etc. in the drive unit 50. Further, the interface 25 enables charging start and end signals to be transferred with respect to the power supply section 60.

Additionally, the interface 25 may include a universal interface for connection to a computer's peripheral unit, e.g., a serial interface such as RS (Recommended Standard)—232C, a parallel interface such as IEEE (Institute of Electrical and Electronics Engineers) 1284, a USB (Universal Serial Bus) interface, an i-Link (IEEE1394) interface, and a SCSI (Small Computer System Interface), so that programs and data are moved with respect to a locally connected external device.

Moreover, the interface 25 may include, as one unit incorporated therein, an infrared communication (IrDA) interface for wireless communication with an external device. From the viewpoint of reception sensitivity, a transmitting and receiving unit for infrared communication is preferably provided at a fore end of the body of the legged moving robot 1, e.g., at the head unit.

The control section 20 further includes a wireless communication interface 26 and a network interface card (NIC) 27 so that data communication can be performed with respect to an external host computer 100 via near-area wireless communication such as Bluetooth and IEEE802.11*b*, a LAN (Local Area Network; e.g., Ethernet), or the Internet.

The data communication between the robot and the host computer is intended to remotely control the operation of the legged moving robot 1 using computer resources in a remote position. Another purpose of the data communication is to supply data and programs necessary for operation control of the robot 1, such as action models and other program code, to the walking robot 1 via a network. Still another purpose of the data communication is to transfer, to the robot side, teaching data obtained by a motion capture, a teaching pendant or the like (as a matter of course, the operator can directly teach motions in the legged moving robot 1 by applying external forces to the machine body of the robot 1).

Figure 5:
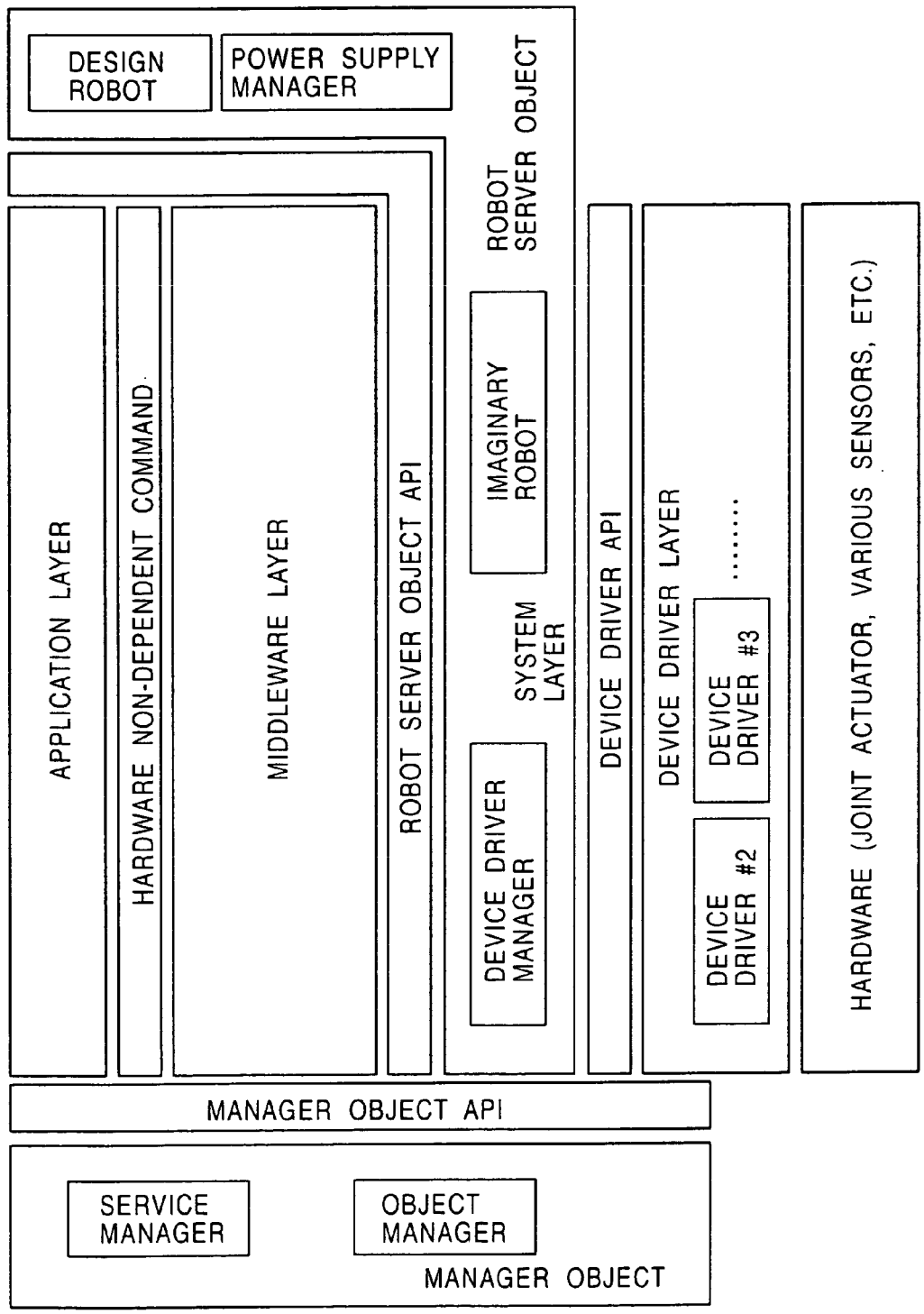
FIG. 5 is a block diagram showing a control configuration of software operating on the robot 1.

The operation control of the legged moving robot 1 is realized in practice by the CPU 21 executing the predetermined software program. FIG. 5 schematically shows a control configuration of software operating on the legged moving robot 1 according to this embodiment.

As shown in FIG. 5, software for robot control has a hierarchical structure made up of multiple layers of software. The control software can be prepared based on object-oriented programming. In that case, each piece of software is handled in units of module, called "object", in which data and processing procedures for the data are united with each other.

A device driver in a lowermost layer is an object that is allowed to make direct access to hardware, such as driving of each joint actuator and reception of the sensor output, and executes relevant processing in response to an interrupt request from the hardware.

An imaginary robot is an object that intermediates between each of various device drivers and the object operating in accordance with a predetermined inter-object communication protocol. Any access to each of hardware devices constituting the legged moving robot 1 is performed through the imaginary robot.

A service manager is a system object for prompting each object to make connection in accordance with inter-object connection information described in a connection file.

Software at a level higher than the system layer is in the form of a module for each object (process) and is constructed such that any object can be easily selected and replaced with another one for each required function. By rewriting the connection file, therefore, input/output of the object matched in data type can be freely connected.

Software modules other than the device driver layer and the system layer are mainly divided into a middleware layer and an application layer.

Figure 6:
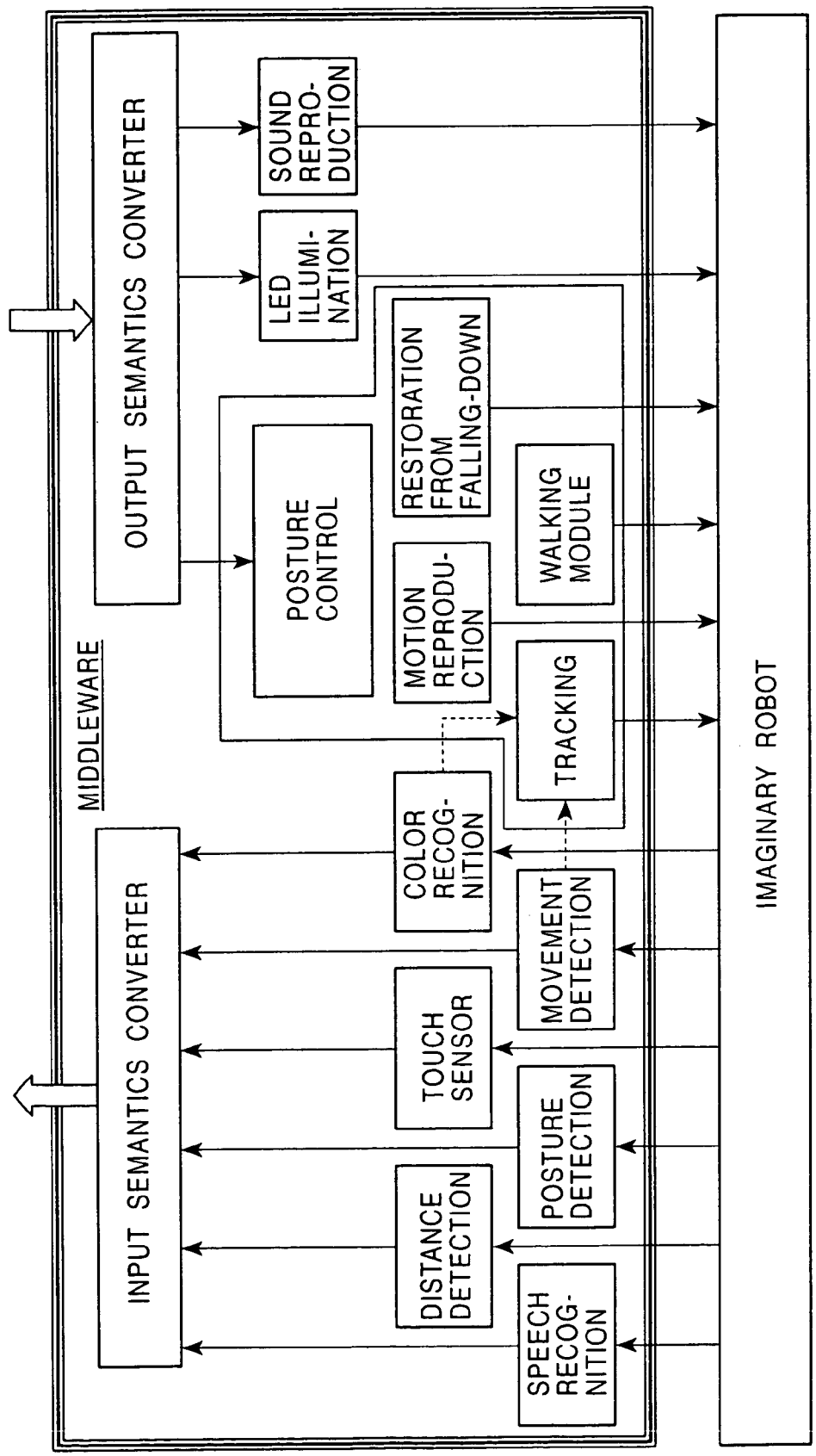
FIG. 6 is a block diagram showing an internal configuration of a middleware layer.

FIG. 6 schematically shows an internal configuration of the middleware layer.

The middleware layer is a collection of software modules providing the basic functions of the legged moving robot 1. The configuration of each module depends on hardware attributes such as mechanical and electrical characteristics, specifications and shape of the legged moving robot 1.

From the functional point of view, the middleware layer can be divided into recognition-system middleware (left half in FIG. 6) and output-system middleware (right half in FIG. 6).

The recognition-system middleware receives and processes raw data supplied from the hardware, such as image data, speech data and other detected data from the sensors, through the imaginary robot. More specifically, the recognition-system middleware executes processing, such as speech recognition, distance detection, posture detection, touch, movement detection and color recognition, in accordance with various kinds of input information, and then obtains recognition results (e.g., "a ball was detected", "falling-down was detected", "it was stroked", "it was beaten", "the music scale of do, mi and so was heard", "(a moving object) was detected", "(an obstacle) was detected", and "(an obstacle) was recognized"). The recognition results are notified to the upper-level application layer through an input semantics converter, and are utilized in subsequent steps such as planning of a behavior program and learning.

On the other hand, the output-system middleware provides the functions such as walking, reproduction of motions, synthesis of output sounds, and illumination control of an LED corresponding to the eye. More specifically, the output-system middleware receives the behavior program planned in the application layer through an output semantics converter, produces a servo command value for each robot joint per function of the legged moving robot 1, an output sound, an output light (LED), an output speech, etc., and outputs it, i.e., issues it as a body action of the legged moving robot 1 through the imaginary robot. With such a mechanism, the application layer can control the legged moving robot 1 by applying not a physical command, such as a control command for the joint actuator, but a more abstractive behavior command (such as for walking ahead or back, showing pleasure, barking, sleeping, exercising, showing surprise, or tracking).

Figure 7:
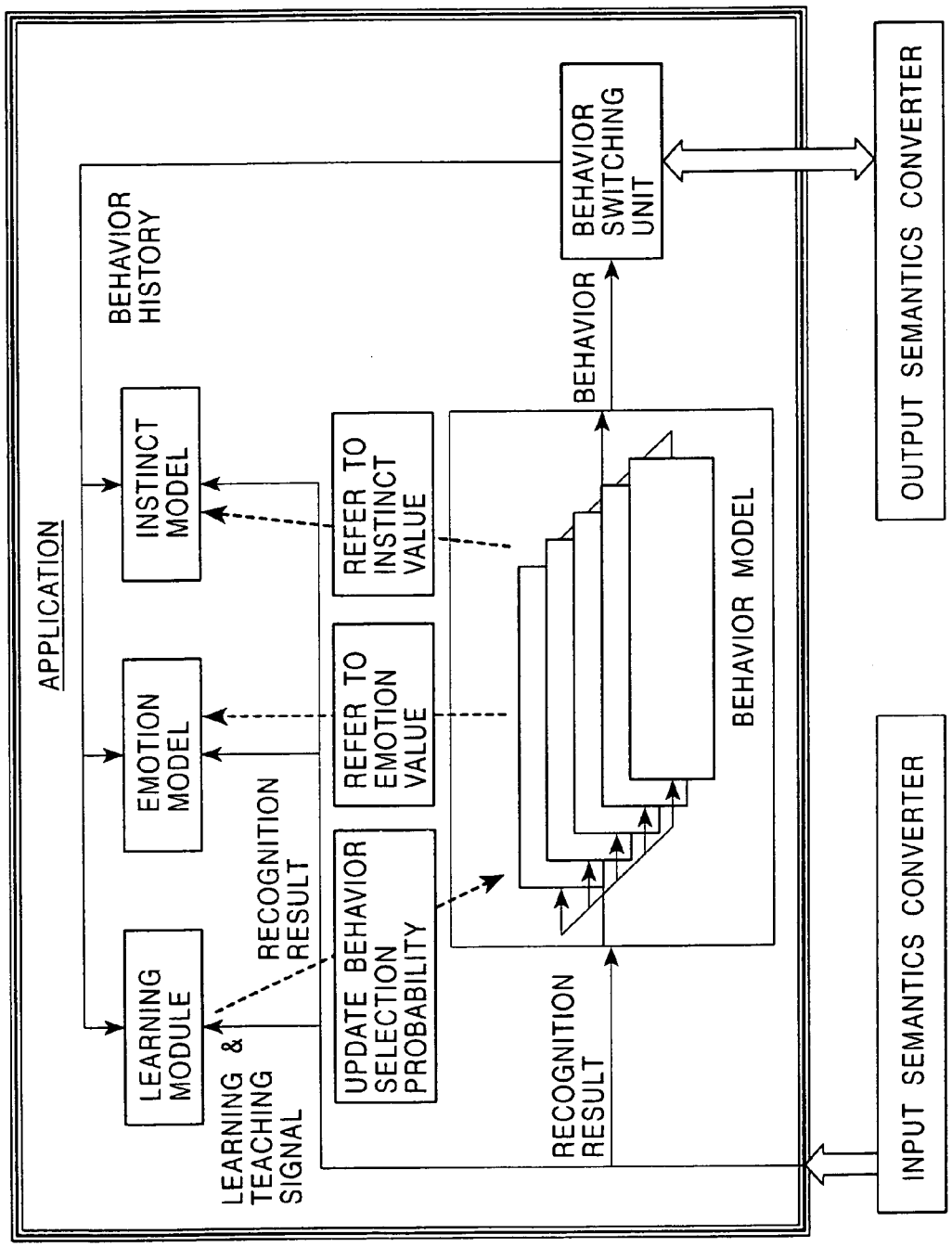
FIG. 7 is a block diagram showing an internal configuration of an application layer.

FIG. 7 schematically shows an internal configuration of the application layer. The application layer is made up of one or more pieces of application software for controlling body actions and internal states, such as instinct and emotion, of the legged moving robot 1.

The application decides a behavior program of the legged moving robot 1 using the recognition result received through the input semantics converter, and returns the decided behavior through the output semantics converter.

The application comprises an emotion model including emotions of the robot in the modeled form, an instinct model including emotions of the robot in the modeled form, a learning module for sequentially storing external events, a behavior model including behavior patterns in the modeled form, and a behavior switching unit for switching over an output destination of the behavior decided by the behavior model.

The recognition result applied through the input semantics converter is inputted to the emotion model, the instinct model and the behavior model, and also inputted as a learning and teaching signal to the learning module.

The behavior of the legged moving robot 1 decided by the behavior model is transmitted to the middleware via the behavior switching unit and the output semantics converter, and then executed on the machine body of the legged moving robot 1. As another route, the decided behavior is supplied, as behavior history, to the emotion model, the instinct model and the learning module.

Each of the emotion model and the instinct model receives, as inputs, the recognition result and the behavior history, and manages an emotion value and an instinct value. The behavior model can refer to the emotion value and the instinct value. Further, the learning module updates a behavior selection probability in response to the learning and teaching signal and supplies the updated contents to the behavior model.

The learning module according to this embodiment performs learning of time-serial data by correlating the time-serial data, which is obtained through a motion teaching device (not shown), such as a motion capture and a teaching pendant, or through direct teaching to the machine body by the operator, with joint angle parameters. A system of recurrent neural network is employed for learning of the time-serial data.

Herein, the term "neural network" means a simplified model of the neural network in the human brain and is a network in which nerve cells, i.e., neurons, are interconnected through synapses allowing signals to pass only in one direction. Signal transmission between neurons is performed through synapses, and various kinds of information processing can be realized by properly adjusting resistance of each synapse, i.e., a weight applied from each synapse. Specifically, each neuron receives outputs from other one or more neurons after being weighed by respective synapses, modifies the total sum of input values in accordance with a nonlinear response function, and outputs the modified result to another neuron.

Also, the recurrent neural network allows connection having a relationship that an output issued from each unit in the past is returned to another unit (or itself) within the network. Accordingly, the recurrent neural network can include such a dynamic property that respective states of the neurons are changed depending on time, and can recognize and predict a time-serial pattern.

With such a recurrent neural network constructed in the hierarchical form, the learning module in this embodiment is able to automatically divide and store motion patterns given as time-serial data, and to reproduce various motion patterns through motion control performed by combining the divided pieces of the time-serial data with each other.

Figure 8:
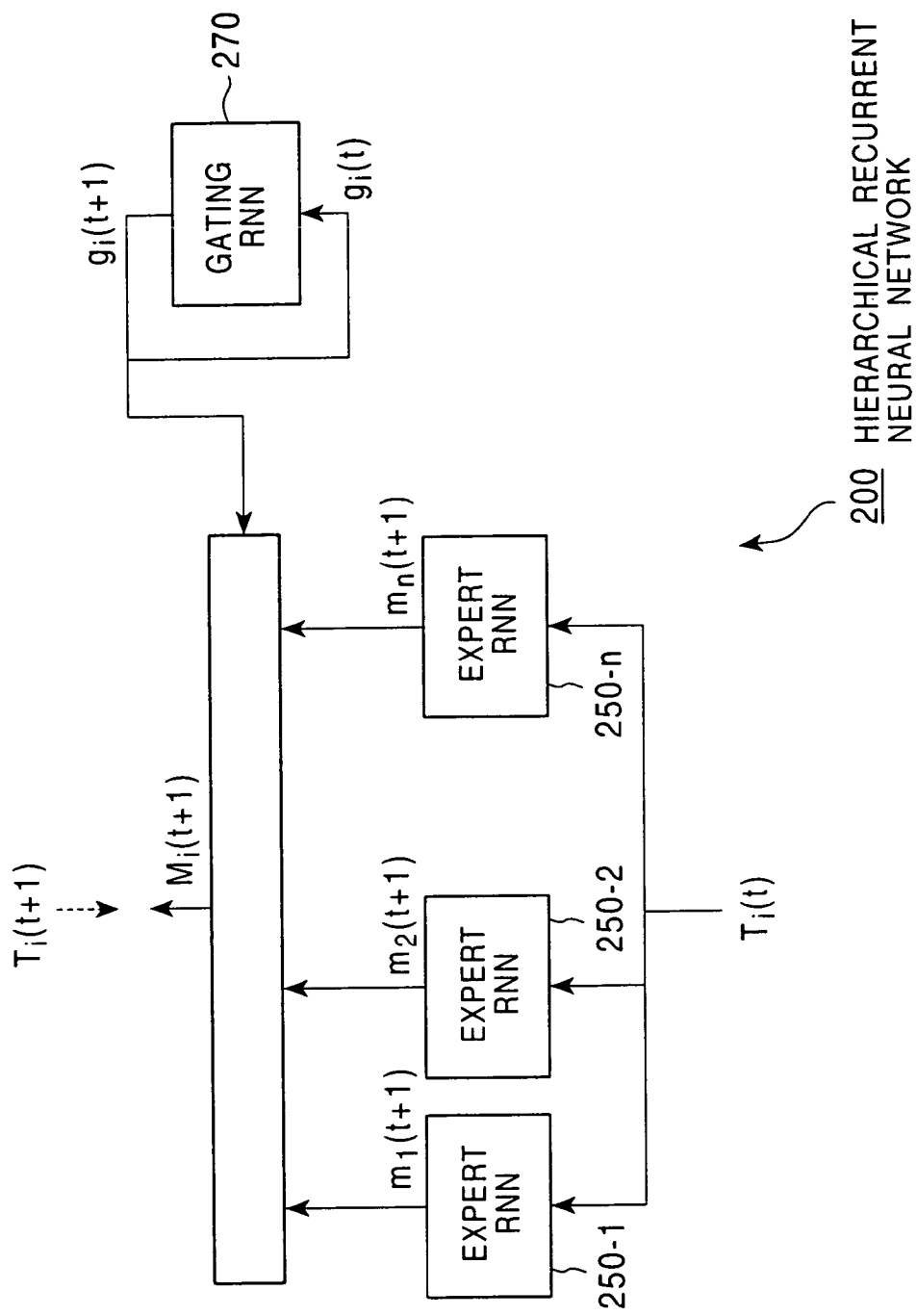
FIG. 8 is a block diagram showing a configuration of a hierarchical recurrent neural network according to the embodiment.

FIG. 8 schematically shows a configuration of the hierarchical recurrent neural network according to this embodiment.

The hierarchical recurrent neural network shown in FIG. 8 is constructed by arranging individual recurrent neural networks (described later) in the hierarchical form.

An illustrated hierarchical recurrent neural network 200 comprises lower-level modules constituted by a plurality of expert recurrent neural networks 250-1, 250-2, . . . , 250-n learning local time-serial patterns, and an upper-level module constituted by a gating recurrent neural network 270 learning an overall time-serial pattern that can be expressed as a combination of the local time-serial patterns.

Taught motion joint-angle time-serial data $T_i(t)$ is inputted to each expert recurrent neural network 250-$i$ constituting the lower-level module. The taught motion joint-angle time-serial data $T_i(t)$ is given as a control command value $m_i(t)$ for each joint of the legged moving robot 1. The taught motion joint-angle time-serial data $T_i(t)$ can be provided through teaching work using, e.g., a motion capture, a teaching pendant or direct teaching. Corresponding to the input of the taught motion joint-angle time-serial data $T_i(t)$, the expert recurrent neural network 250-$i$ outputs a joint-angle control command value prediction $m'_i(t+1)$.

The gating recurrent neural network constituting the upper-level module outputs a gate $g_i(t)$ serving as a weight value assigned for each expert recurrent neural networks 250-$i$.

By applying the gate, i.e., the weight $g_i(t+1)$, from the gating recurrent neural network 270 constituting the upper-level module to the output $m_i(t+1)$ of the expert recurrent Aneural network 250-$i$ constituting the lower-level module, and then merging respective results together, a joint-angle control command value prediction $M_i(t+1)$ for the entire module handled by the hierarchical recurrent neural network 200 is outputted.

The individual expert recurrent neural networks 250-1, 250-2, . . . , 250-$n$ constituting the lower-level modules handle corresponding joint angles, i.e., local motion patterns in the legged moving robot 1. Each expert recurrent neural network 250-$i$ selectively stores, as time-serial data, the motion pattern $m_i(t)$ taught regarding the corresponding joint angle. Then, when the learned motion pattern appears from the time-serial data $m_i(t)$ inputted at next time, the expert recurrent neural network 250-$i$ outputs a command value prediction $m_i(t+1)$ as a detected signal.

The upper-level module merges the command value prediction $m_i(t+1)$ from each lower-level module together after applying the corresponding gate $g_i(t+1)$, i.e., the weight, assigned from the gating recurrent neural network, and then outputs $M_i(t+1)$ representing the overall command value prediction for the entire module to be handled by the hierarchical recurrent neural network 200.

In a learning process with the hierarchical recurrent neural network 200 shown in FIG. 8, taught motion joint-angle time-serial data $T_i(t+1)$ is provided as a target value at next time t+1. Then, the state of each gate in the gating recurrent neural network 270 is controlled in accordance with an error between $T_i(t+1)$ and the output $M_i(t+1)$ of the entire module obtained by merging the output $m_i(t+1)$ of each expert recurrent neural network 250-$i$ together.

Details of the configuration and operation of the hierarchical recurrent neural network are disclosed in, e.g., Japanese Unexamined Patent Application Publication No. 11-126198 (entitled: "Data Processing Apparatus and Method, and Storage Medium Product"), which was already assigned to the applicant of this application.

Figure 9:
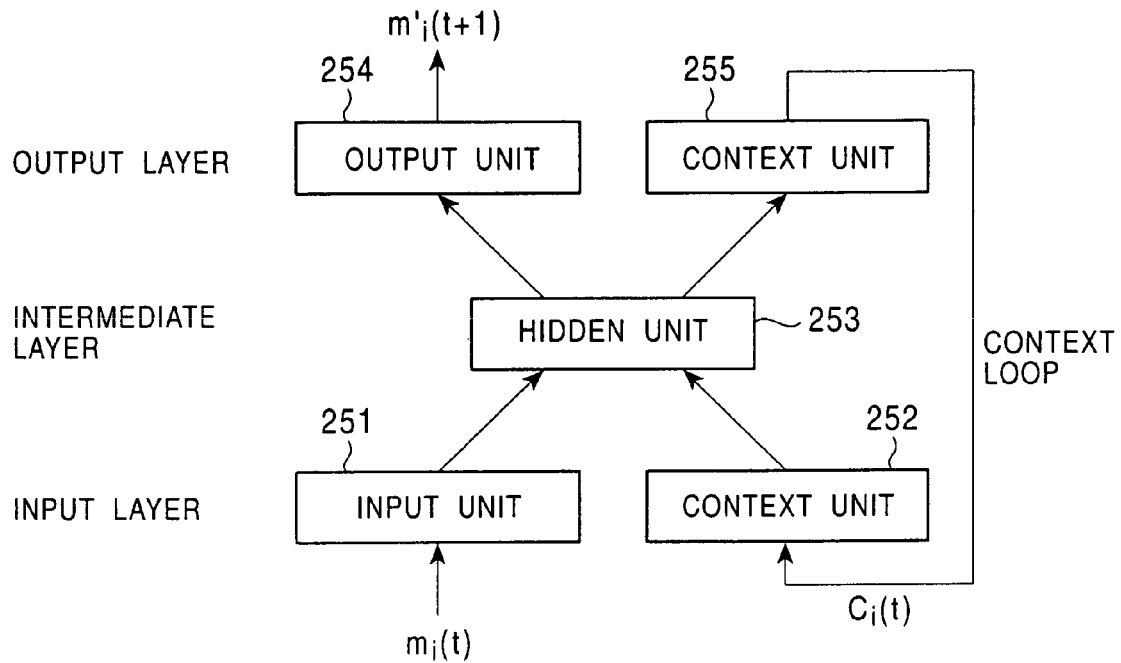
FIG. 9 is a block diagram showing one example of a configuration of an expert recurrent neural network 250 constituting a lower-level module of the hierarchical recurrent neural network.
Figure 10:
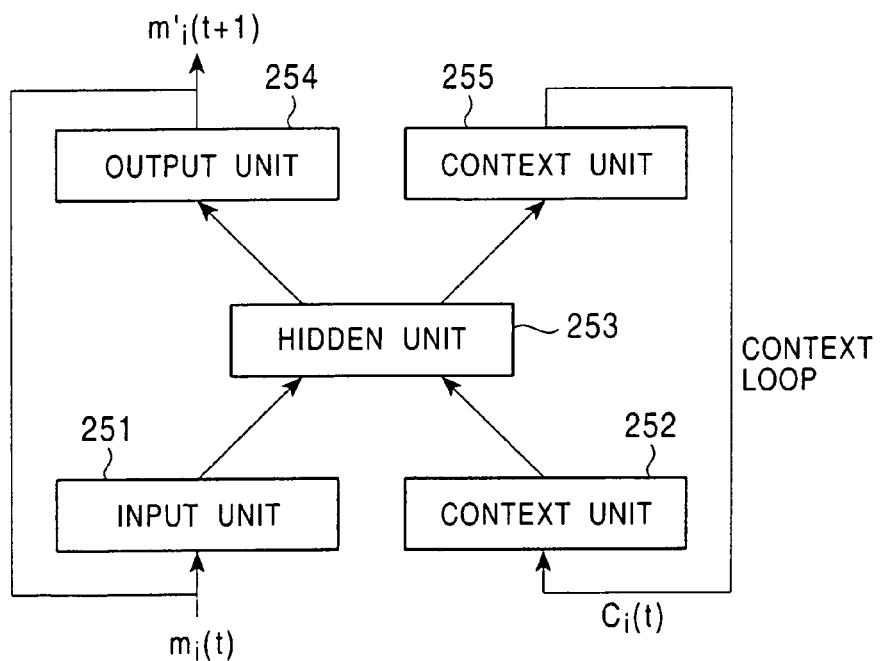
FIG. 10 is a block diagram showing one example of the configuration of the expert recurrent neural network 250 operating in the closed mode.

FIG. 9 schematically shows one example of the configuration of the expert recurrent neural network 250-$i$ constituting the lower-level module of the hierarchical recurrent neural network 200 shown in FIG. 8. FIG. 10 schematically shows one example of the configuration of the expert recurrent neural network 250 operating in the closed mode.

As shown in FIG. 9, the expert recurrent neural network 250 comprises an input layer constituted as a unit group to which input data is inputted, an output layer constituted as a unit group which outputs a network output, and an intermediate layer constituted as a unit group other than the above-mentioned unit groups.

In the example shown in FIG. 9, the input layer is made up of an input unit 251 to which a joint-angle control command value $m_i(t)$ for a corresponding joint actuator i is inputted, and a context unit 252. The intermediate layer is constituted as a hidden unit 253. Further, the output layer is made up of an output unit 254 which outputs a joint-angle control command value prediction $m'_i(t)$ for the joint actuator i, and a context unit 255. Each of those units comprises a predetermined number of neurons.

Inputted to the input unit 251 is the joint-angle control command value $m_i(t)$ as time-serial data representing the moment-to-moment states of the corresponding joint actuator i. An output from the neurons of the input unit 251 is supplied to the neurons of the output unit 254 and the context unit 255 through the neurons of the intermediate layer 253.

The neurons of the output unit 254 output the joint-angle control command value prediction $m'_i(t+1)$ for the joint actuator i handled by the expert recurrent neural network 250.

Also, a part of the output from the output unit 254 is fed back, as context $C_i(t)$, to the context unit 252 of the input layer via a context loop. The provision of the context loop enables learning of time-serial events to be performed.

Learning with the expert recurrent neural network 250-*i* shown in FIGS. 9 and 10 is executed by the backpropagation process in accordance with an error between the joint-angle control command value prediction $m'_i(t+1)$ outputted from the network 250-*i* and the joint-angle control command $m_i(t+1)$ actually commanded at next time. With such a neural learning mechanism, motion pattern data at next time can be predicted from the inputted time-serial motion pattern data.

Figure 11:
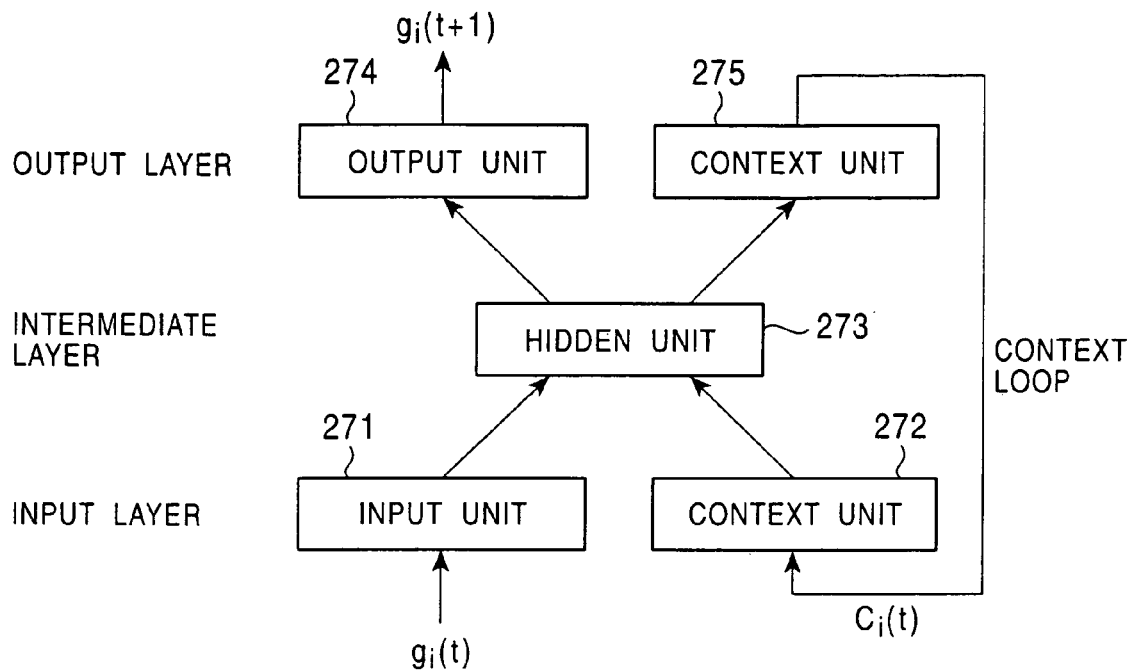
FIG. 11 is a block diagram showing one example of a configuration of a recurrent neural network 250 constituting an upper-level module of the hierarchical recurrent neural network.
Figure 12:
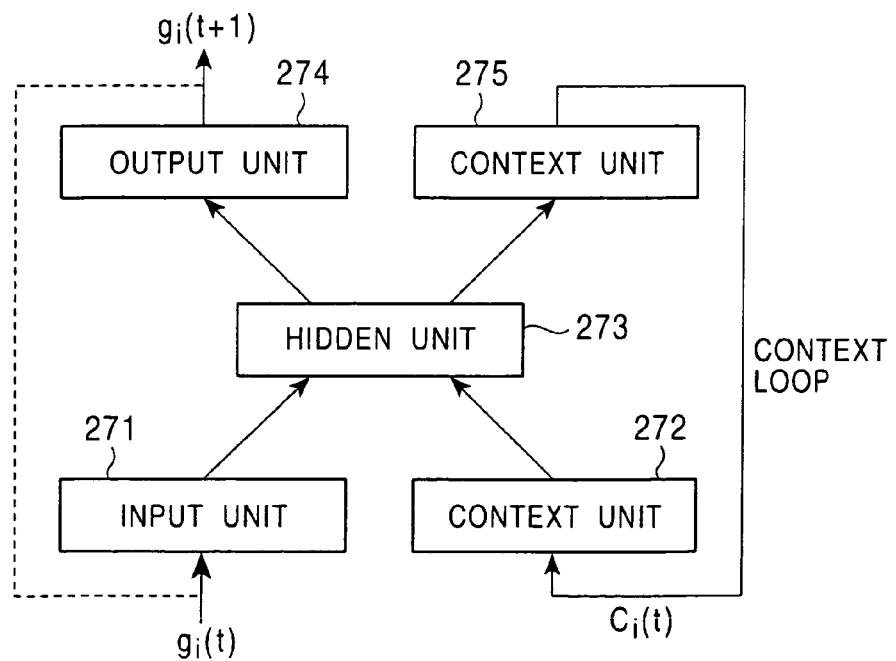
FIG. 12 is a block diagram showing one example of the configuration of the gating recurrent neural network 250 operating in the closed mode.

FIG. 11 schematically shows one example of a configuration of the gating recurrent neural network 270 constituting the upper-level module of the hierarchical recurrent neural network 200 shown in FIG. 8. FIG. 12 schematically shows one example of the configuration of the gating recurrent neural network 270 operating in the closed mode.

The gating recurrent neural network 270 learns an overall time-serial pattern that can be expressed as a combination of the local time-serial patterns provided by the individual expert recurrent neural networks 250-1, etc.

As shown in FIG. 11, the gating recurrent neural network 270 comprises an input layer constituted as a unit group to which input data is inputted, an output layer constituted as a unit group which outputs a network output, and an intermediate layer constituted as a unit group other than the above-mentioned unit groups.

In the example shown in FIG. 11, the input layer is made up of an input unit 271 to which a gate value $g_i(t)$ serving as an output weight applied to the lower-level module is inputted, and a context unit 272. The intermediate layer is constituted as a hidden unit 273. Further, the output layer is made up of an output unit 274 which outputs a gate value $g_i(t+1)$ serving as an output weight applied to the lower-level module, and a context unit 255. Each of those units comprises a predetermined number of neurons.

Inputted to the input unit 271 is the gate value $g_i(t)$ serving as an output weight applied to the lower-level module. An output from the neurons of the input unit 251 is supplied to the neurons of the output unit 274 and the context unit 275 through the neurons of the intermediate layer 273.

The neurons of the output unit 274 output the gate value $g_i(t+1)$ serving as an output weight applied to the lower-level module.

Also, a part of the output from the output unit 274 is fed back, as context $C_i(t)$, to the context unit 272 of the input layer via a context loop. The provision of the context loop enables learning of time-serial events to be performed.

A learning process in the legged moving robot 1 according to this embodiment will be described below with reference to FIGS. 13 to 18.

Figure 13:
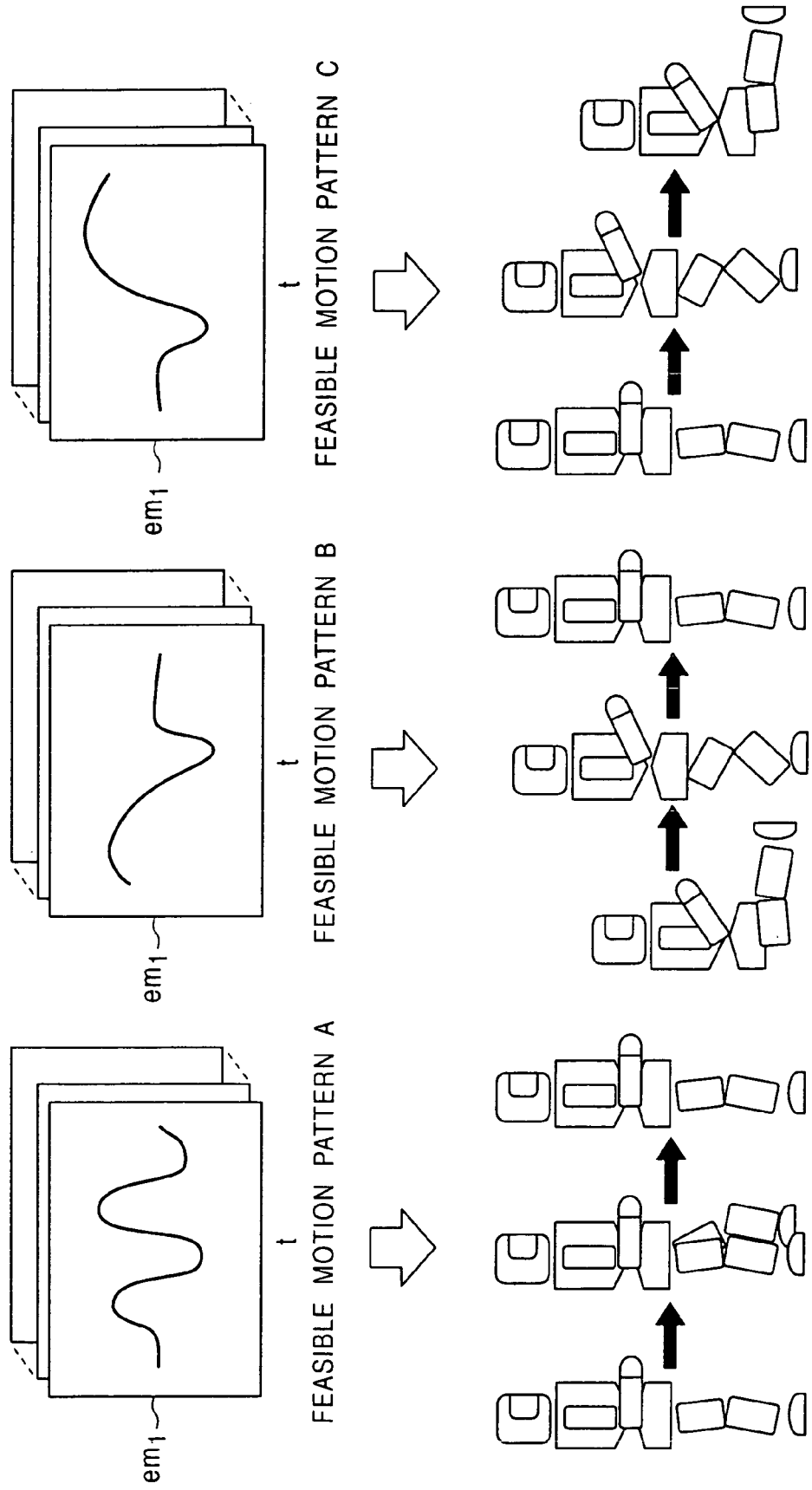
FIG. 13 is a set of explanatory views for explaining a learning process in the legged moving robot 1 according to the embodiment; more specifically.

First, three kinds of motion pattern data A, B and C feasible by the legged moving robot 1 to be controlled are prepared. FIG. 13 illustrates examples of the prepared motion patterns for the legged moving robot 1. In this specification, the "feasible" motion patterns are assumed to be motion patterns for which kinematic matching and dynamic matching, e.g., ZMP stability determining criteria, are ensured in the legged moving robot 1 to be controlled.

The dynamic stability in the legged moving robot 1 is determined by using a ZMP (Zero Moment Point) as a stability determining criterion. Herein, the term "ZMP" means a point on the floor surface at which moments attributable to floor reaction forces caused during walking become zero. Also, the term "ZMP locus" means a locus along which the ZMP moves during a period of, e.g., the robot walking operation. The concept of the ZMP and applications of the ZMP to stability determining criteria of walking robots are described in Miomir Vukobratovic, "LEGGED LOCOMOTION ROBOTS" (Ichiro Kato, et al., "Walking Robot and Artificial Feet", (Nikkan Kogyo Shinbun, Ltd.).

Then, the motion patterns A, B and C are learned by different expert recurrent neural networks 250-1, etc. in the hierarchical recurrent neural network 200, respectively.

An input to the expert recurrent neural network 250 is given as a joint-angle control command value vector em(t) at time t of the motion pattern data in the form of time-serial data, and learning is performed by providing, as an ideal output, a joint-angle control command value vector em(t+1) at time t+1. Learning of time-serial data in the recurrent neural network is performed using the Backpropagation Through Time Algorithm.

When the joint-angle control command value vector em(t) at time t is applied as an input to the expert recurrent neural networks 250-1, etc. after the learning, each network produces as an output a prediction value of the joint-angle control command value vector em(t+1) at time t+1 (see FIG. 14).

By coupling the output unit 254 and the input unit 251 in the network so as to form a closed loop (i.e., upon shift to the closed mode), therefore, the learned motion pattern can be autonomously produced (see FIG. 15).

Figure 16:
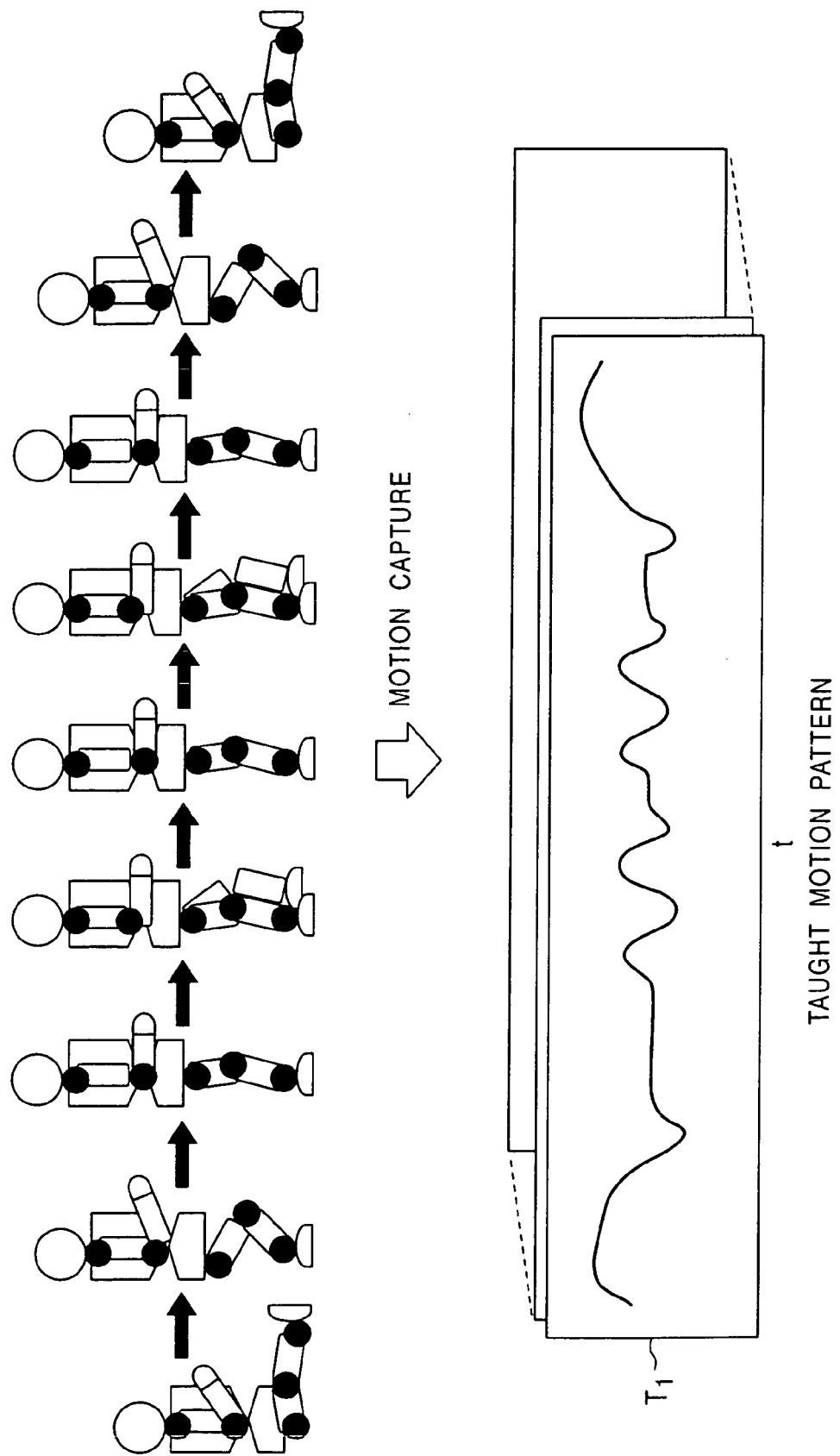
FIG. 16 is a set of explanatory views for explaining a learning process in the legged moving robot 100 according to the embodiment; more specifically.

Then, taught motion pattern data is obtained from motions of a human being (operator) by using a motion capture as motion teaching means (see FIG. 16). As an alternative, taught motion pattern data may be supplied to the legged moving robot 1 with a teaching pendent or direct teaching.

The hierarchical recurrent neural network 200 having, as the lower-level modules, the expert recurrent neural networks 250, etc. (see the above description and FIG. 14) after the learning is rendered to learn the taught motion pattern data obtained by the motion capture, for example. This learning is performed by providing, as an input to the expert recurrent neural network 250, a joint-angle information vector T(t) at time t of the taught motion pattern data, and providing a joint-angle information vector T(t+1) at time t+1 as an ideal output for the entirety of the hierarchical recurrent neural network 200. Here, segmentation learning of time-serial data is performed using the hierarchical recurrent neural network 200.

A learning algorithm based on maximum likelihood estimation can be used for the segmentation learning of time-serial data using the hierarchical recurrent neural network 200. See, e.g., Japanese Unexamined Patent Application Publication No. 11-126198, which was already assigned to the applicant of this application, regarding the segmentation learning of time-serial data based on maximum likelihood estimation.

Figure 17:
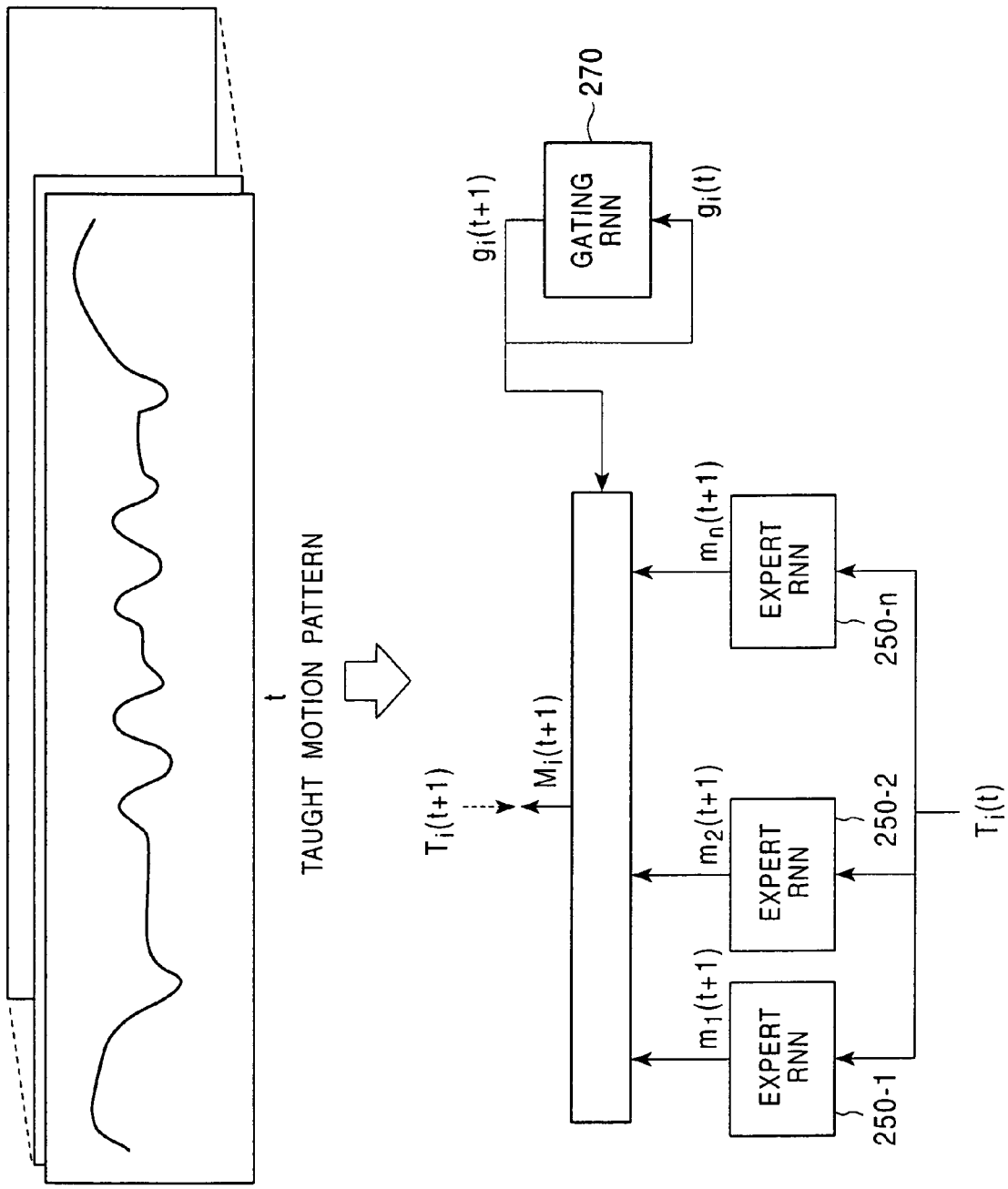
FIG. 17 is a set of explanatory views for explaining a learning process in the legged moving robot 100 according to the embodiment; more specifically.

However, learning is not performed here on the expert recurrent neural networks 250-1, etc. constituting the lower-level modules (see FIG. 17).

Figure 18:
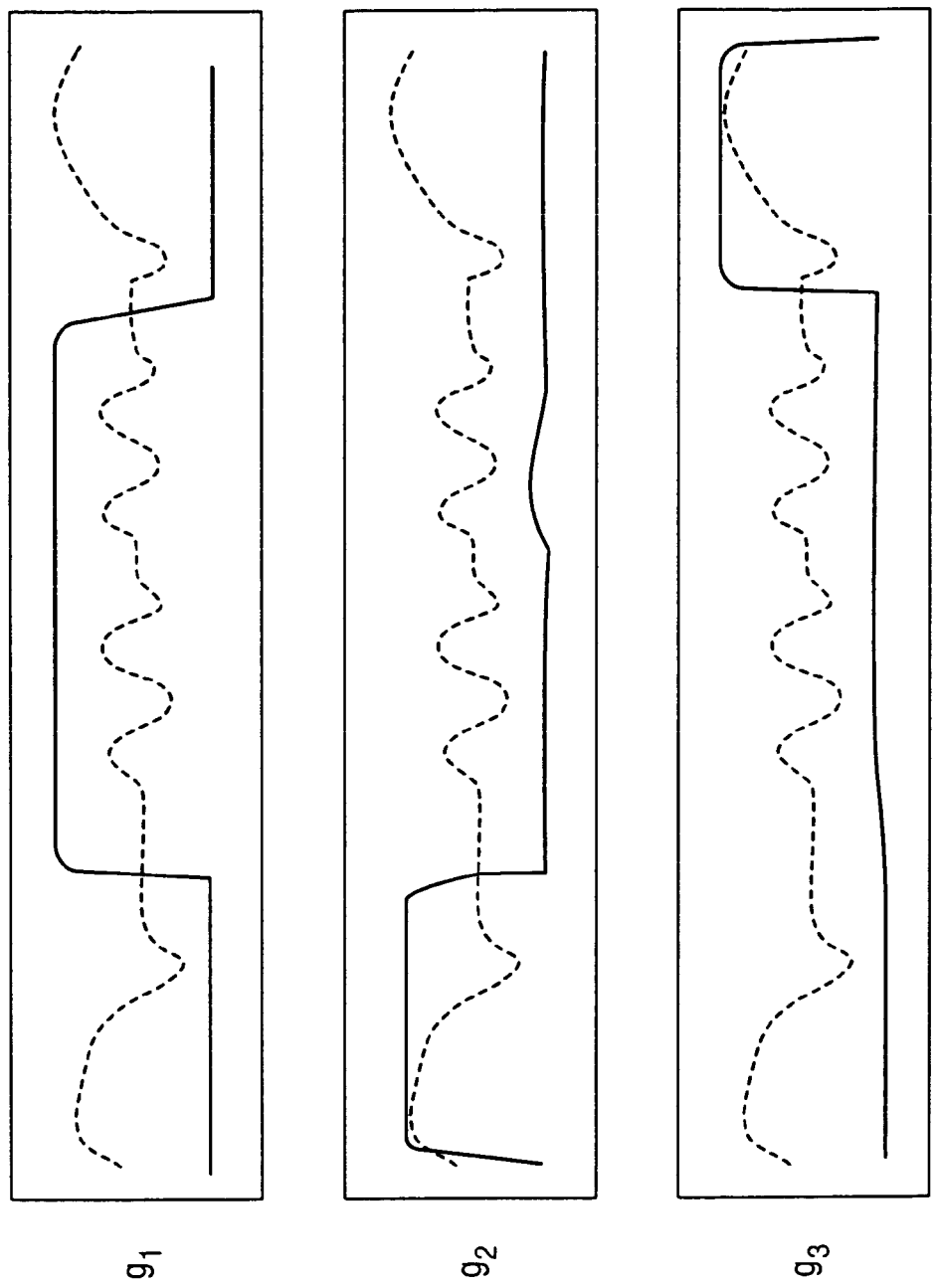
FIG. 18 is a set of explanatory views for explaining a learning process in the legged moving robot 100 according to the embodiment; more specifically.
Figure 19:
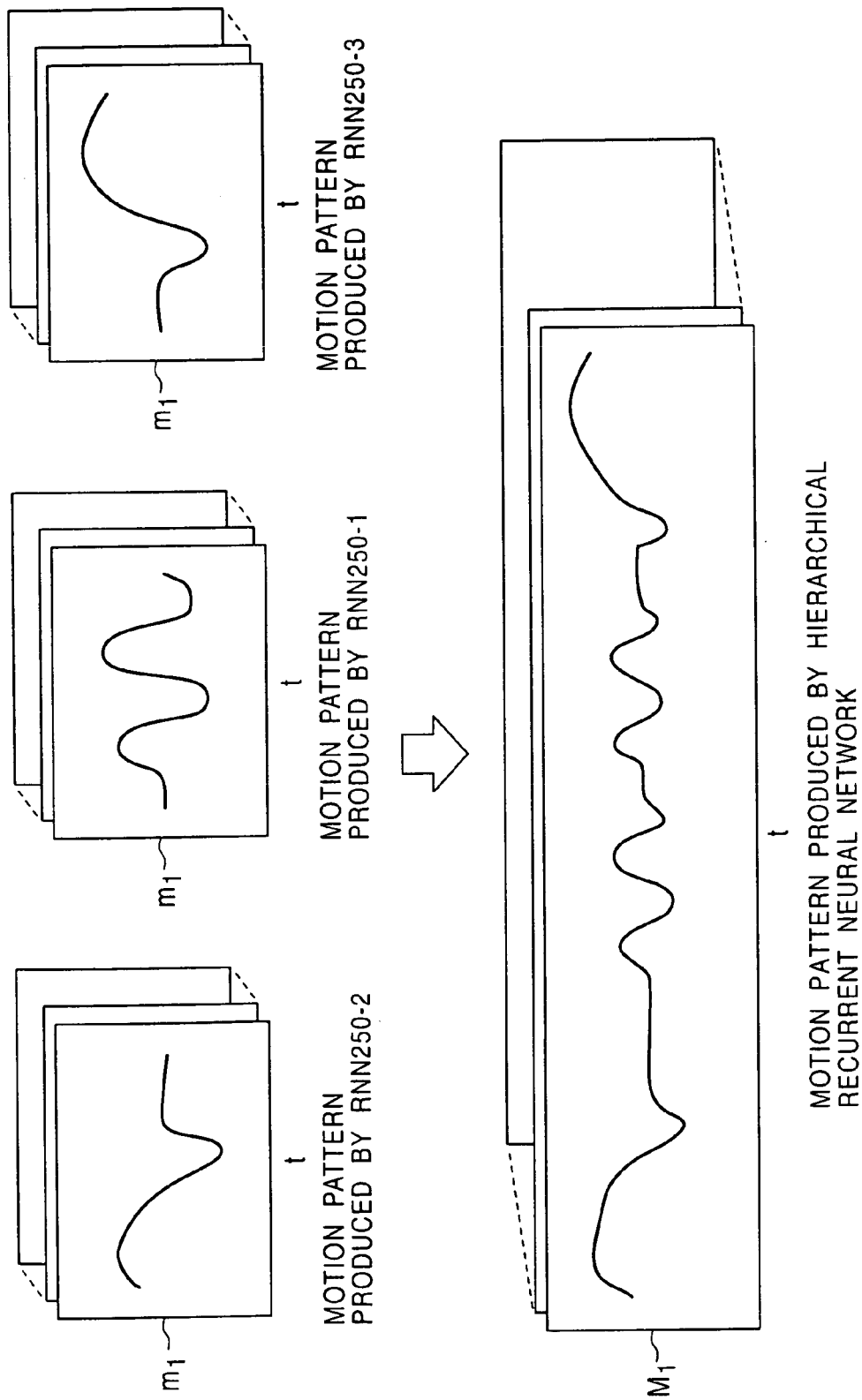
FIG. 19 is a set of explanatory views for explaining a learning process in the legged moving robot 100 according to the embodiment; more specifically.

The hierarchical recurrent neural network 200 is able to learn a combined expression of the lower-level modules, which is required for reconstructing the taught motion pattern, as a gate value pattern produced by the gating recurrent neural network 270 constituting the upper-level module (see FIG. 18).

The taught motion pattern can be reconstructed by weighting respective motion patterns produced by the expert recurrent neural networks 250-1, etc. constituting the lower-level modules with the gate value pattern produced by the gating recurrent neural network 270, and then combining the weighted motion patterns together.

The taught motion can be reproduced by performing motion control of the legged moving robot 1 using the motion pattern thus reconstructed.

Supplement

The present invention has been described above in detail in connection with a particular embodiment. It is, however, apparent that modifications and substitutions can be made on the embodiment by those skilled in the art without departing the scope of the present invention.

The gist of the present invention is not necessarily limited to products called "robots". More specifically, the present invention is similarly applicable to even a product belonging to any other industrial field, e.g., a toy, so long as the product is a mechanical machine capable of performing motions in imitation of human actions based on electrical or magnetic working.

In other words, it is to be understood that the present invention has been disclosed above merely by way of example, and should not be interpreted in a limiting way. The scope of the present invention should be judged in consideration of the matters defined in claims.

INDUSTRIAL APPLICABILITY

According to the present invention, a superior legged moving robot is provided which can learn motion patterns in the form of time-serial data using a recurrent neural network. A method of teaching motions in the robot and a storage medium product can also be provided.

According to the present invention, various actions taught by an operator can be realized on a humanoid robot using motion patterns feasible by the robot and having been learned in advance.

The invention claimed is:

1. A legged moving robot including drive units with plural degrees of freedom of joints, the robot comprising:
   a motion pattern input unit for inputting a motion pattern from the exterior;
   a plurality of determining units for previously storing local feasible motion patterns regarding respective degrees of freedom of joints, and each determining agreement between a motion pattern inputted from said motion pattern input unit and the stored motion pattern;
   a gate unit for gating a determination result in each of said determining units; a merging unit for merging outputs from said gate unit and producing an overall motion pattern for a machine body of said legged moving robot; and
   a taught motion pattern realizing unit for storing a totalized result in said merging unit as taught motion pattern data, and/or reproducing the result on the machine body of said legged moving robot,
   wherein said motion pattern input unit is constituted as a motion capturing device for capturing, by a camera, measurement points attached to various positions over the whole body of an operator, tracking movements of the measurement points, and obtaining motions of a skeleton to realize the taught motion pattern, or constituted as a device for inputting motion pattern data obtained through said motion capturing device.

2. A legged moving robot including drive units with plural degrees of freedom of joints, the robot comprising:
   a motion pattern input unit for inputting a motion pattern from the exterior;
   a plurality of determining units for previously storing local feasible motion patterns regarding respective degrees of freedom of joints, and each determining agreement between a motion pattern inputted from said motion pattern input unit and the stored motion pattern;
   a gate unit for gating a determination result in each of said determining units; a merging unit for merging outputs from said gate unit and producing an overall motion pattern for a machine body of said legged moving robot; and
   a taught motion pattern realizing unit for storing a totalized result in said merging unit as taught motion pattern data, and/or reproducing the result on the machine body of said legged moving robot,
   wherein each of said plurality of determining units is constituted as a recurrent neural network comprising an input layer constituted as a unit group to which input data is inputted, an output layer constituted as a unit group which outputs a network output, and an intermediate layer constituted as a unit group other than said unit groups, said input layer being made up of an input unit to which a local time-serial motion pattern for the machine body of said legged moving robot is inputted, and a context unit, said intermediate layer being constituted as a hidden unit, said output layer being made up of an output unit which outputs a prediction of the local time-serial motion pattern, and a context unit, a part of the output from said output layer being fed back to the context unit of the input layer via a context loop, whereby learning of the time-serial motion pattern is performed.

3. A legged moving robot including drive units with plural degrees of freedom of joints, the robot comprising:
   a motion pattern input unit for inputting a motion pattern from the exterior;
   a plurality of determining units for previously storing local feasible motion patterns regarding respective degrees of freedom of joints, and each determining agreement between a motion pattern inputted from said motion pattern input unit and the stored motion pattern;
   a gate unit for gating a determination result in each of said determining units; a merging unit for merging outputs from said gate unit and producing an overall motion pattern for a machine body of said legged moving robot; and
   a taught motion pattern realizing unit for storing a totalized result in said merging unit as taught motion pattern data, and/or reproducing the result on the machine body of said legged moving robot,
   wherein said gate unit is constituted as a recurrent neural network comprising an input layer constituted as a unit group to which input data is inputted, an output layer constituted as a unit group which outputs a network output, and an intermediate layer constituted as a unit group other than said unit groups, said input layer being made up of an input unit to which a gate serving as a weight applied to the determining unit is inputted, and a context unit, said intermediate layer being constituted as a hidden unit, said output layer being made up of an output unit which outputs a gate serving as a weight applied to the determining unit, and a context unit, a part of the output from said output layer being fed back to the context unit of the input layer via a context loop, whereby learning of the time-serial gate is performed.

4. A method of teaching motions in a legged moving robot including drive units with plural degrees of freedom of joints, the method comprising the steps of: a motion pattern inputting step of inputting a motion pattern from the exterior;
- a plurality of determining steps of previously storing local feasible motion patterns regarding respective degrees of freedom of joints, and each determining agreement between a motion pattern inputted in said motion pattern inputting step and the stored motion pattern;
- a gating step of gating a determination result in each of said determining steps;
- a merging step of merging outputs from said gating step and producing an overall motion pattern for a machine body of said legged moving robot; and
- a taught motion pattern realizing step of storing a totalized result in said merging step as taught motion pattern data, and/or reproducing the result on the machine body of said legged moving robot,
- wherein said motion pattern inputting step is constituted by a device for inputting motion pattern data obtained through a motion capture, said motion capture capturing, by a camera, measurement points attached to various positions over the whole body of an operator, tracking movements of the measurement points, and obtaining motions of a skeleton to realize the taught motion pattern.

5. A method of teaching motions in a legged moving robot including drive units with plural degrees of freedom of joints, the method comprising the steps of: a motion pattern inputting step of inputting a motion pattern from the exterior;
- a plurality of determining steps of previously storing local feasible motion patterns regarding respective degrees of freedom of joints, and each determining agreement between a motion pattern inputted in said motion pattern inputting step and the stored motion pattern;
- a gating step of gating a determination result in each of said determining steps;
- a merging step of merging outputs from said gating step and producing an overall motion pattern for a machine body of said legged moving robot; and
- a taught motion pattern realizing step of storing a totalized result in said merging step as taught motion pattern data, and/or reproducing the result on the machine body of said legged moving robot,
- wherein each of said plurality of determining step is constituted by a recurrent neural network comprising an input layer constituted as a unit group to which input data is inputted, an output layer constituted as a unit group which outputs a network output, and an intermediate layer constituted as a unit group other than said unit groups, said input layer being made up of an input unit to which a local time-serial motion pattern for the machine body of said legged moving robot is inputted, and a context unit, said intermediate layer being constituted as a hidden unit, said output layer being made up of an output unit which outputs a prediction of the local time-serial motion pattern, and a context unit, a part of the output from said output layer being fed back to the context unit of the input layer via a context loop, whereby learning of the time-serial motion pattern is performed.

6. A method of teaching motions in a legged moving robot including drive units with plural degrees of freedom of joints, the method comprising the steps of: a motion pattern inputting step of inputting a motion pattern from the exterior;
- a plurality of determining steps of previously storing local feasible motion patterns regarding respective degrees of freedom of joints, and each determining agreement between a motion pattern inputted in said motion pattern inputting step and the stored motion pattern;
- a gating step of gating a determination result in each of said determining steps;
- a merging step of merging outputs from said gating step and producing an overall motion pattern for a machine body of said legged moving robot; and
- a taught motion pattern realizing step of storing a totalized result in said merging step as taught motion pattern data, and/or reproducing the result on the machine body of said legged moving robot,
- wherein said gating step is constituted as a recurrent neural network comprising an input layer constituted as a unit group to which input data is inputted, an output layer constituted as a unit group which outputs a network output, and an intermediate layer constituted as a unit group other than said unit groups, said input layer being made up of an input unit to which a gate serving as a weight applied to the determining unit is inputted, and a context unit, said intermediate layer being constituted as a hidden unit, said output layer being made up of an output unit which outputs a gate serving as a weight applied to the determining unit, and a context unit, a part of the output from said output layer being fed back to the context unit of the input layer via a context loop, whereby learning of the time-serial gate is performed.

\* \* \* \* \*